United States Patent
Zhang et al.

(10) Patent No.: US 11,803,735 B2
(45) Date of Patent: Oct. 31, 2023

(54) NEURAL NETWORK CALCULATION APPARATUS AND METHOD

(71) Applicant: Cambricon Technologies Corporation Limited, Beijing (CN)

(72) Inventors: Yao Zhang, Beijing (CN); Shaoli Liu, Beijing (CN); Bingrui Wang, Beijing (CN); Xiaofu Meng, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 901 days.

(21) Appl. No.: 16/697,191

(22) Filed: Nov. 27, 2019

(65) Prior Publication Data

US 2020/0097803 A1    Mar. 26, 2020

Related U.S. Application Data

(63) Continuation of application No. 16/697,189, filed on Nov. 27, 2019, which is a continuation-in-part of (Continued)

(30) Foreign Application Priority Data

Dec. 11, 2017  (CN) .......................... 201711315639.9

(51) Int. Cl.
  *G06N 3/063* (2023.01)
  *G06F 9/22* (2006.01)
  (Continued)

(52) U.S. Cl.
  CPC ............. *G06N 3/063* (2013.01); *G06F 9/223* (2013.01); *G06N 3/04* (2013.01); *G06N 3/045* (2023.01); *G06N 3/082* (2013.01); *G06N 3/10* (2013.01)

(58) Field of Classification Search
  None
  See application file for complete search history.

(56) References Cited

U.S. PATENT DOCUMENTS 8,983,885 B1   3/2015  Bhatt et al.
9,460,384 B2  10/2016  Levin et al.
(Continued)

FOREIGN PATENT DOCUMENTS

CN   1732448 A   2/2006
CN  101625759 A   1/2010
(Continued)

OTHER PUBLICATIONS

Tsukamoto et al., "Distributed Learning and Cooperative Learning", Proceedings of 1993 Joint Conference on Neural Networks (Year: 1993).*
(Continued)

*Primary Examiner* — Alexey Shmatov
*Assistant Examiner* — Beatriz Ramirez Bravo
(74) *Attorney, Agent, or Firm* — Getech Law LLC; Jun Ye

(57) ABSTRACT

The present disclosure discloses a neural network processing module, in which a mapping unit is configured to receive an input neuron and a weight, and then process the input neuron and/or the weight to obtain a processed input neuron and a processed weight; and an operation unit is configured to perform an artificial neural network operation on the processed input neuron and the processed weight. Examples of the present disclosure may reduce additional overhead of the device, reduce the amount of access, and improve efficiency of the neural network operation.

20 Claims, 25 Drawing Sheets

Related U.S. Application Data application No. PCT/CN2018/120047, filed on Dec. 10, 2018.

(51) Int. Cl.
   *G06N 3/10* (2006.01)
   *G06N 3/04* (2023.01)
   *G06N 3/082* (2023.01)
   *G06N 3/045* (2023.01)

(56) References Cited

U.S. PATENT DOCUMENTS

| | | | |
|---|---|---|---|
| 2013/0204818 | A1 | 8/2013 | Ouyang et al. |
| 2013/0204848 | A1 | 8/2013 | Akirav et al. |
| 2015/0146525 | A1 | 5/2015 | Shibata et al. |
| 2016/0358075 | A1 | 12/2016 | Zhang et al. |
| 2018/0330235 | A1 | 11/2018 | Lin et al. |
| 2019/0303743 | A1* | 10/2019 | Venkataramani ... G06F 9/30145 |

FOREIGN PATENT DOCUMENTS

| | | | | |
|---|---|---|---|---|
| CN | 103929210 | A | | 7/2014 |
| CN | 104346607 | A | | 2/2015 |
| CN | 104598971 | A | | 5/2015 |
| CN | 104679868 | A | | 6/2015 |
| CN | 105488565 | A | | 4/2016 |
| CN | 105512723 | A | | 4/2016 |
| CN | 105874477 | A | | 8/2016 |
| CN | 106250939 | A | | 12/2016 |
| CN | 107239825 | A | | 10/2017 |
| CN | 107316078 | A | | 11/2017 |
| CN | 107545303 | A * | 1/2018 | ......... G06F 9/30007 |
| CN | 107992329 | A | | 5/2018 |
| CN | 109697509 | A | | 4/2019 |
| CN | 109993291 | A | | 7/2019 |
| EP | 3407266 | A1 | | 11/2018 |
| TW | I607387 | B | | 12/2017 |
| WO | WO-9314461 | A1 * | 7/1993 | ............. G06N 3/063 |
| WO | 2017124646 | A1 | | 7/2017 |

OTHER PUBLICATIONS

Zhang et al., "Cambricon-X: An Accelerator for Sparse Neural Networks", 2016 49th Annual IEEE/ACM International Symposium on Microarchitecture (MICRO) (Year: 2016).*
Chen et al., "Compressing Neural Networks with the Hashing Trick", (2015) (Year: 2015).*
Adam, et al. "Sparcnet: A hardware accelerator for efficient deployment of sparse convolutional networks." ACM Journal on Emerging Technologies in Computing Systems (JETC), vol. 13, No. 3, Jul. 2017, pp. 1-32.
CN 201711315639.9—First Office Action, dated Oct. 8, 2019, 32 pages.
CN 201711315639.9—Second Office Action, dated Dec. 23, 2019, 26 pages.
CN 201711315639.9—Notification to Grant Patent Right for Invention, dated Apr. 22, 2022, 3 pages.
CN 201711343477.X—First Office Action, dated Sep. 23, 2019, 51 pages.
CN 201711343477.X—Second Office Action, dated Dec. 4, 2019, 51 pages.
CN 201711343477.X—Third Office Action, dated Mar. 16, 2020, 7 pages.
CN 201711343477.X—Notification to Grant Patent Right for Invention, dated Apr. 16, 2020, 3 pages.
CN 201711343478.4—First Office Action, dated Sep. 23, 2019, 28 pages.
CN 201711343478.4—Second Office Action, dated Jan. 7, 2020, 9 pages.
CN 201711343478.4—Notification to Grant Patent Right for Invention, dated Feb. 7, 2020, 5 pages.
CN 201711371887.5—First Office Action, dated Sep. 12, 2019, 35 pages.
CN 201711371887.5—Notification to Grant Patent Right for Invention, dated Jul. 31, 2020, 3 pages.
CN 201711371887.5—Second Office Action, dated Dec. 18, 2019, 37 pages.
CN 201711371887.5—Third Office Action, dated Apr. 1, 2020, 8 pages.
CN 201711371888.X—First Office Action, dated Sep. 18, 2019, 25 pages.
CN 201711371888.X—Second Office Action, dated Dec. 18, 2019, 19 pages.
CN 201711371888.X—Third Office Action, dated Apr. 9, 2020, 8 pages.
CN 201711371888.X—Notification to Grant Patent Right for Invention, dated Jun. 15, 2020, 3 pages.
CN 201711371889.4—First Office Action, dated Sep. 18, 2019, 20 pages.
CN 201711371889.4—Second Office Action, dated Dec. 12, 2019, 20 pages.
CN 201711371889.4—Third Office Action, dated Aug. 17, 2020, 7 pages.
CN 201810042043.4—First Office Action, dated Dec. 11, 2019, 8 pages.
CN 201810042043.4—Second Office Action, dated Mar. 16, 2020, 18 pages.
CN 201810042043.4—Notification to Grant Patent Right for Invention, dated Jun. 24, 2020, 4 pages.
CN 201810042283.4—First Office Action, dated Sep. 30, 2019, 11 pages.
CN 201810042283.4—Notification to Grant Patent Right for Invention, dated Dec. 18, 2019, 3 pages.
EP18889924.9—Extended European Search Report, dated Aug. 18, 2020, 8 pages.
EP19214536.5—Extended European Search Report, dated Apr. 24, 2020, 8 pages.
EP19214548.0—Extended European Search Report, dated May 13, 2020, 8 pages.
Lieelement et al., "New Materials Science and Technology-Volume of Metals", Guangzhou: Warth Technology University Press, Sep. 30, 2012, pp. 897-901.
Parashar, Angshuman, et al. "SCNN: An accelerator for compressed-sparse convolutional neural networks." ACM SIGARCH computer architecture news, vol. 45, No. 2, May 2017, pp. 27-40.
PCT/CN2018/120047—International Search Report and Written Opinion, dated Mar. 8, 2019, 13 pages.
Simone Scardapane et al., "Group sparse regulation for deep neural networks", ELSEVIER, Feb. 10, 2017, pp. 81-89.
Tao, "Optimization of Collaborative Filtering Recommendation Algorithm and its empirical system implementation", Full Database Information Technology Series of Chinese Master Thesis, vol. 2017, Issue2, Feb. 15, 2017, pp. 29-30(No English translation).
EP19214548. 0—Communication pursuant to Article 94(3) EPC dated May 15, 2023, 7 pages.
EP18889924. 9—Communication pursuant to Article 94(3) EPC dated May 8, 2023, 9 pages.
EP19214536.5—Communication pursuant to Article 94(3) EPC dated May 2, 2023, 9 pages.

* cited by examiner

NEURAL NETWORK CALCULATION APPARATUS AND METHOD

TECHNICAL FIELD

The disclosure relates to the field of neural network, and specifically relates to a neural network operation device and method.

BACKGROUND

Artificial Neural Networks (ANNs) is abbreviated as Neural Networks (NNs). ANN is an algorithmic mathematical model that imitates behavioral features of animal neural networks to perform distributed and parallel information processing. This network relies on the complexity of a system and processes information by adjusting interconnection among plenty of internal nodes.

A neural network is an algorithm with a large amount of computation and memory access. The larger the count of weights in a neural network is, the larger the amount of the computation and the memory access will be. In order to reduce the amount of the computation and the count of the weights, and thus reduce the memory access, a sparse neural network is proposed. The sparse neural network is defined as: a neural network where the count of weights with the value being zero is large and the distribution of weights with the value being non-zero is irregular. The ratio of the count of elements with the weight being 0 to the count of all weight elements in a neural network is defined as the sparsity of the neural network, as shown in FIG. 1a.

In the prior art, sparse neural network operations are involved in the execution of graphics and image operations or scientific computing of GPU. Since GPU is a device specifically configured to perform graphics and image operations or scientific computing and there is no specific support for sparse convolution neural network operations, plenty of front-end decoding work is still needed, which brings a large amount of extra overhead. In addition, GPU only has a small on-chip cache, so model data (weights) of a multi-layer artificial neural network needs to be transported from off-chip repeatedly. Therefore, the off-chip bandwidth has become the main performance bottleneck and also brings huge power consumption.

SUMMARY

Examples of the present disclosure provide a neural network computation device and method. By processing data of a neural network, the neural network device and method may reduce workload of decoding before performing an artificial neural network operation, which may reduce extra overhead and increase operating speed.

In a first aspect, examples provide a neural network operation module including:
- a mapping unit configured to process input data after receiving the input data to obtain processed input data, in which the input data includes at least one input neuron and at least one weight, and the processed input data includes a processed input neuron and a processed weight;
- a storage unit configured to store the processed input neuron, the processed weight, a neural network instruction, and an operation result;
- a direct memory access unit configured to read/write data between the storage unit and an instruction caching unit, a first input caching unit, a second input caching unit, or an output caching unit;
- the instruction caching unit configured to cache the neural network instruction read by the direct memory access unit;
- the first input caching unit configured to cache first cache data read by the direct memory access unit, in which the first cache data is the processed input neuron or the processed weight;
- the second input caching unit configured to cache second cache data read by the direct memory access unit, in which the second cache data is the processed weight or the processed input neuron, and the second cache data is inconsistent with the first cache data;
- an instruction control unit configured to obtain the neural network instruction from the instruction caching unit and decode the neural network instruction into a microinstruction executed by an operation unit;
- the operation unit configured to obtain the processed input neuron and the processed weight from the first input caching unit and the second input caching unit, and then perform the artificial neural network operation on the processed input neuron and the processed weight according to the microinstruction to obtain the operation result; and
- the output caching unit configured to cache the operation result.

In a second aspect, examples of the present disclosure provide another neural network operation module including:
- a storage unit configured to store input data, a neural network instruction, and an operation result, in which the input data includes at least one input neuron and at least one weight;
- a direct memory access unit configured to read/write data between the storage unit and an instruction caching unit, a mapping unit, or an output caching unit;
- a mapping unit configured to process the input data after obtaining the input data to obtain processed input data, in which the processed input data includes processed input neurons and processed weights;
- the instruction caching unit configured to cache the neural network instruction read by the direct memory access unit;
- an instruction control unit configured to obtain the neural network instruction from the instruction caching unit and decode the neural network instruction into a microinstruction executed by an operation unit;
- the operation unit configured to obtain the processed input neuron and the processed weight, and then perform the artificial neural network operation on the processed input neuron and the processed weight according to the microinstruction to obtain the operation result; and
- the output caching unit configured to cache the operation result.

In a third aspect, examples of the present disclosure provide another neural network operation module including:
- a storage unit configured to store first input data and connection data of the first input data, processed second input data, a neural network instruction, and an operation result, in which the first input data is an input neuron weight, the connection data of the first input data is connection data of an input neuron or a weight, and the processed second input data is a processed input neuron or a processed weight;
- a mapping unit configured to obtain the first input data and the connection data of the first input data, and then process the first input data according to the connection data of the first input data to obtain the processed first input data, in which the processed first input data is the processed input neuron or the processed weight, and the processed first input data is inconsistent with the processed second input data;

the instruction control unit configured to obtain the neural network instruction from the instruction caching unit and decode the neural network instruction into a microinstruction executed by an operation unit;

the operation unit configured to obtain the processed first input data and the processed second input data, and then perform the artificial neural network operation on the processed first input data and the processed second input data according to the microinstruction to obtain the operation result; and the output caching unit configured to cache the operation result.

In a fourth aspect, examples of the present disclosure provide a neural network operation method including:

processing input data to obtain processed input data;

obtaining a neural operation instruction and decoding the neural operation instruction into a microinstruction; and performing an artificial neural network on the processed input data according to the microinstruction to obtain an operation result.

In a fifth aspect, examples of the present disclosure provides a neural network operation device, in which the neural network operation device includes the one or more neural network operation modules of the first, second, and third aspect. The neural network operation device is configured to obtain data to be operated and control information from other processing devices, perform a specified neural network operation to obtain an operation result, and then transmit the operation result to other processing devices through an I/O interface; and when the neural network operation device includes a plurality of the neural network operation modules, the plurality of the neural network operation modules may be connected through a specific structure and transmit data between each other.

The plurality of the neural network operation modules interconnect and transmit data through a PCIE (Peripheral Component Interface-Express, PCI-E or PCIe) bus to support larger-scale neural network operations; share the same one control system or have respective control systems; share the same one memory or have respective memories; and deploy an interconnection manner of any arbitrary interconnection topology.

In a sixth aspect, examples provide a combined processing device, and the combined processing device may include the neural network operation device of the fifth aspect, a universal interconnection interface, and other processing devices. The neural network operation device may be configured to interact with the other processing devices to jointly perform operations specified by users.

In a seventh aspect, examples provide a neural network chip, and the neural network chip may include the neural network operation module of the first aspect, the neural network operation module of the second aspect, the neural network operation device of the third aspect, the neural network operation device of the fifth aspect, or the combined processing device of the sixth aspect.

In an eighth aspect, examples provide a neural network chip package structure, and the neural network chip package structure may include the neural network chip of the seventh aspect.

In a ninth aspect, examples provide a board card, and the board card may include the neural network chip package structure of the eighth aspect.

In a tenth aspect, examples provide an electronic device, and the electronic device may include the neural network chip of the seventh aspect, or the board card of the ninth aspect.

It can be seen that in the scheme of the examples of the present disclosure, the mapping unit processes the input neuron and the weight to obtain the processed input neuron and the processed weight, and the operation unit performs the artificial neural network operation on the processed input neuron and the processed weight according to the microinstruction obtained by the instruction control unit decoding the neural network instruction. Compared with the prior art, the examples of the present disclosure reduce the workload of decoding before performing the artificial neural network operation, which may reduce the extra overhead and improve the operating speed.

The aspects or other aspects of the present disclosure will be more concise and easier to understand in the description of the following examples.

BRIEF DESCRIPTION OF THE DRAWINGS

To describe the technical solutions in the examples of the present disclosure more clearly, the following briefly introduces the accompanying drawings required for describing the examples. Apparently, the accompanying drawings in the following description merely illustrate some examples of the present disclosure. Those of ordinary skill in the art may also obtain other drawings based on these accompanying drawings without creative efforts.

DETAILED DESCRIPTION OF THE EXAMPLES

The examples of the present disclosure are described in detail below.

The terms such as "first", "second", "third", "fourth" and the like configured in the specification, the claims, and the accompanied drawings of the present disclosure are configured for distinguishing between different objects rather than describing a particular order. The terms "include" and "comprise" as well as variations thereof are intended to cover non-exclusive inclusion. For example, a process or a method including a series of steps or a system, a product, a device, or an apparatus including a series of units is not limited to the listed steps or units, and may alternatively include other steps or units that are not listed; alternatively, other steps or units inherent to the process, method, product, or device may be included.

The term "example" or "implementation" referred to in the present disclosure means that a particular feature, structure, or characteristic described in conjunction with the example may be contained in at least one example of the present disclosure. The phrase appearing in various places in the specification does not necessarily refer to the same example, nor does it refer to an independent or alternative example that is mutually exclusive with other examples. It is expressly and implicitly understood by those skilled in the art that an example described in the present disclosure may be combined with other examples.

Figure 1A:
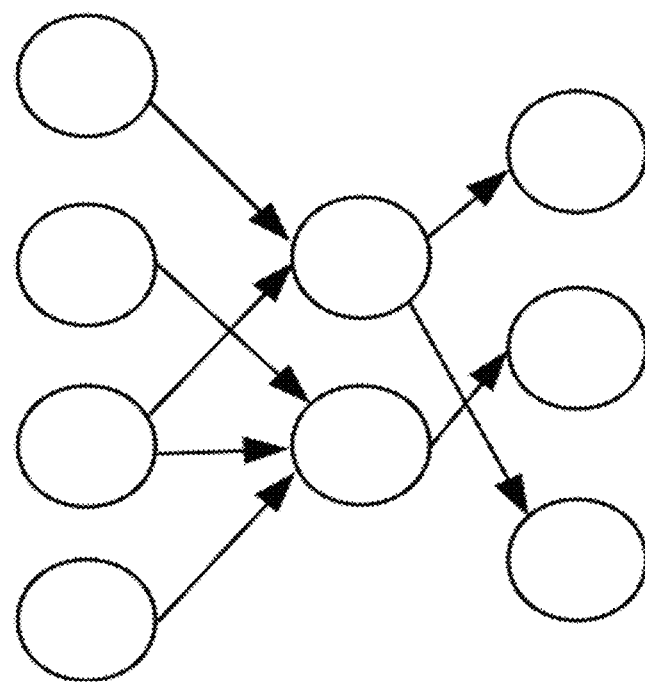
FIG. 1a is a schematic structural diagram of a sparse neural network according to an example of the present disclosure.
Figure 1B:
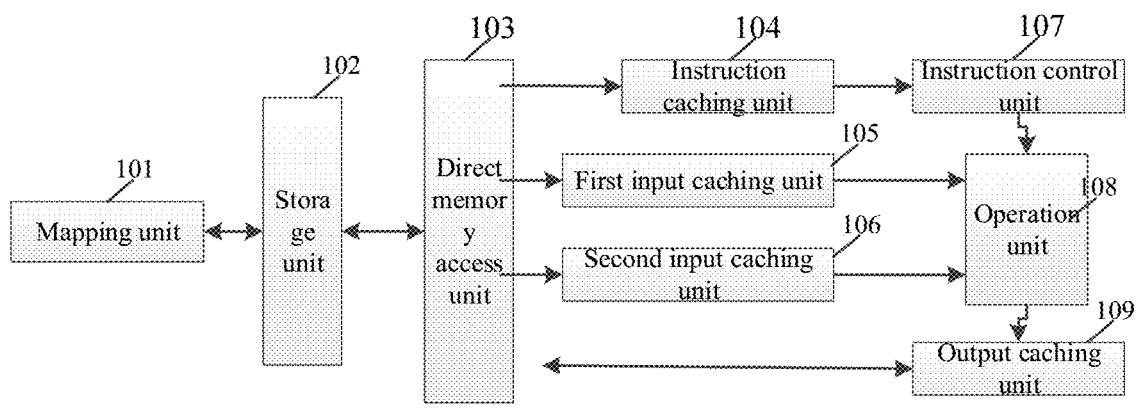
FIG. 1b is a schematic structural diagram of a neural network operation module according to an example of the present disclosure.

FIG. 1b is a schematic structural diagram of a neural network operation module according to an example of the present disclosure. The neural network operation module is configured to accelerate a sparse neural network operation. As shown in FIG. 1b, a neural network operation module 100 includes: a mapping unit 101, a storage unit 102, a direct memory access (DMA) unit 103, an instruction caching unit 104, a first input caching unit 105, a second input caching unit 106, an instruction control unit 107, an operation unit 108, and an output caching unit 109.

The mapping unit 101 is configured to receive input data and then process the input data to obtain processed input data, in which the input data includes at least one input neuron and at least one weight, and the processed input data includes a processed input neuron and a processed weight.

The input data includes at least one input neuron and at least one weight. The mapping unit 101 is configured to determine whether an absolute value of each of the at least one input neuron is greater than a first threshold. If the absolute value of an input neuron is smaller than or equal to the first threshold, the mapping unit 101 deletes the input neuron; and if the absolute value of the input neuron is greater than the first threshold, the mapping unit 101 retains the input neuron and outputs a deleted output neuron as a processed input neuron. The mapping unit 101 obtains connection data of the input neuron, in which the connection data of the input neuron represents position information of the input neuron whose absolute value is greater than the first threshold in the at least one input neuron. The mapping unit 101 is further configured to determine whether the absolute value of each of the at least one weight is greater than a second threshold. If the absolute value of a weight is smaller than or equal to the second threshold, the mapping unit 101 deletes the weight, and selects a relevant weight from a deleted weight according to the connection data of the input neuron to output as the processed weight.

In an example, the input data may include the at least one input neuron and the at least one weight. The mapping unit 101 determines whether the absolute value of each of the at least one weight is greater than the second threshold. If the absolute value of the weight is smaller than or equal to the second threshold, the mapping unit 101 deletes the weight; and if the absolute value of the weight is greater than the second threshold, the mapping unit 101 retains the weight and outputs the deleted weight as the processed weight. The mapping unit 101 obtains connection data of the weight, in which the connection data of the weight refers to data representing connection between the at least one input neuron and an output neuron. The mapping unit 101 determines whether the absolute value of each of the at least one input neuron is greater than the first threshold. If the absolute value of the input neuron is smaller than or equal to the first threshold, the mapping unit 101 deletes the input neuron and selects the relevant input neuron from the deleted input neuron according to the connection data of the weight to output as the processed input neuron.

Furthermore, the mapping unit 101 stores the processed input neurons and the processed weights into the storage unit 102 in a one-to-one corresponding format.

Specifically, the method of the mapping unit 101 storing the processed input neurons and the processed weights in the one-to-one corresponding format refers to taking each of the processed input neurons and the corresponding processed weights as a data set, and storing the data set in the storage unit 102.

Figure 2:
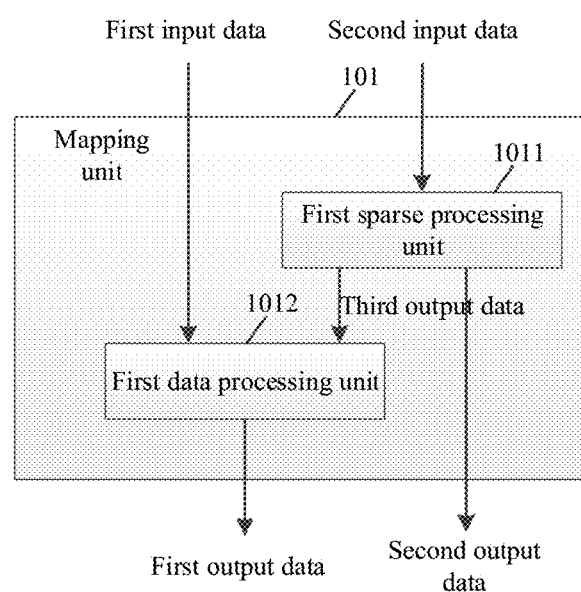
FIG. 2 is a schematic diagram of a partial structure of a neural network operation module according to an example of the present disclosure.

Specifically, as shown in FIG. 2, the mapping unit 101 includes:
a first sparse processing unit 1011 configured to process second input data to obtain third output data and second output data, and transmit the third output data to a first data processing unit 1012; and
the first data processing unit 1012 configured to receive first input data and the third output data, and output first output data according to the third output data and the first input data.

When the first input data includes at least one input neuron and the second input data includes the at least one weight, the first output data is the processed input neuron, the second output data is the processed weight, and the third output data is the connection data of the weight; when the first input data includes the at least one weight and the second input data includes the at least one input neuron, the first output data is the processed weight, the second output data is the processed input neuron, and the third output data is the connection data of the input neuron.

Specifically, when the second input data is a weight and the form of the weight is $w_{ij}$, the $w_{ij}$ represents the weight between an $i^{th}$ input neuron and a $j^{th}$ output neuron; the first sparse processing unit 1011 determines the connection data (the third output data) according to the weight, and deletes the weight whose absolute value is smaller than or equal to the second threshold in the weight to obtain the processed weight (the second output data); when the second input data is an input neuron, the first sparse processing unit 1011 obtains the connection data according to the input neuron, and deletes the input neuron whose absolute value is smaller than or equal to the first threshold in the input neuron to obtain the processed input neuron.

Alternatively, the first threshold may be 0.1, 0.08, 0.05, 0.02, 0.01, 0.3, or other values.

Alternatively, the second threshold may be 0.1, 0.08, 0.06, 0.05, 0.02, 0.01, 0, or other values.

It should be noted that the first threshold and the second threshold may be consistent or inconsistent.

For example, if the second input data are 1.2, 1.4, 0.2, 0.7, and 0.1, and the first or the second threshold is 0.3, the third output data of the first sparse processing unit 1011 is 10110 and the second output data are 1.2, 1.4, and 0.7.

It should be noted that the first sparse processing unit may be regarded as a comparator to output the data satisfying conditions.

The connection data may be expressed in a form of stride index or direct index.

Specifically, the connection data represented in the form of direct index is a string composed of 0 and 1. When the second input data is a weight, 0 represents that the absolute value of the weight is smaller than or equal to the second threshold, which means that the input neuron corresponding to the weight is not connected with the output neuron corresponding to the weight; and 1 represents that the absolute value of the weight is greater than the second threshold, which means that the input neuron corresponding to the weight is connected with the output neuron corresponding to the weight. The connection data in the form of direct index may have two orders of representation to represent the connection of weights: a string of 0 and 1 composed of the connection state between each output neuron and all input neurons, or a string of 0 and 1 composed of the connection state between each input neuron and all output neurons. When the second input data is an input neuron, 0 represents that the absolute value of the input neuron is smaller than or equal to the first threshold, and 1 represents that the absolute value of the input neuron is greater than the first threshold.

When the second input data is a weight, the connection data represented in the form of stride index is a string composed of values of distance between an input neuron connected with an output neuron and a previous input neuron connected with the output neuron; when the second input data is an input neuron, the data represented in the form of stride index is represented by a string composed of the values of distance between an input neuron whose absolute value is greater than the first threshold and the previous input neuron whose absolute value is greater than the first threshold.

Figure 3:
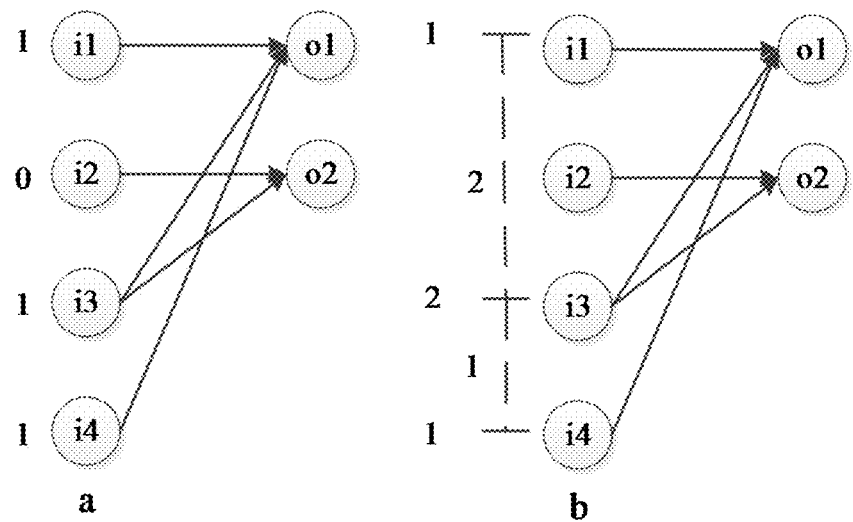
FIG. 3 is a schematic structural diagram of a neural network according to an example of the present disclosure.

For example, both the first threshold and the second threshold are 0.01. FIG. 3 is a schematic diagram of a neural network according to an example of the present disclosure. As shown in Fig. a of FIG. 3, the first input data are input neurons, which include input neurons i1, i2, i3, and i4, and the second input data are weights. For the output neuron o1, the weights are $w_{11}$, $w_{21}$, $w_{31}$, and $w_{41}$; and for the output neuron o2, the weights are $w_{12}$, $w_{22}$, $w_{32}$, and $w_{42}$, in which all the values of the weights $w_{21}$, $w_{12}$ and $w_{42}$ are 0, so all the absolute values of the weights $w_{21}$, $w_{12}$ and $w_{42}$ are smaller than the first threshold 0.01. The first sparse processing unit 1011 determines that the input neuron i2 and output neuron o1 are not connected, the input neurons i1 and i4 are not connected with the output neurons o2, the input neurons i1, i3 and i4 are connected with the output neuron o1, and the input neurons i2 and i3 are connected with the output neurons o2. When the connection data is represented by the connection state of each output neuron and all the input neurons, the connection data of the output neuron o1 and the output neuron o2 are "1011" and "0110" respectively, which means that the connection data is "10110110"; and when the connection data is represented by the connection state of each input neuron and all the output neurons, the connection data of the input neuron i1 is "10", the connection data of the input neuron i2 is "01", the connection data of the input neuron i3 is "11", and the connection data of the input neuron i4 is "10", which means that the connection data is "10011110".

For the output neuron o1, the mapping unit 101 takes the i1 and $w_{11}$, i3 and $w_{31}$, and i4 and $w_{41}$ as a data set respectively, and stores the data set in the storage unit 102; for the output neuron o2, the mapping unit 101 takes the i2 and $w_{22}$, and i3 and $w_{32}$ as a data set respectively, and stores the data set in the storage unit 102.

For the output neuron o1, the second output data are $w_{11}$, $w_{31}$, and $w_{41}$; and for the output neuron o2, the second output data are $w_{22}$ and $w_{32}$.

When the second input data are the input neurons i1, i2, i3, and i4, and the values of the input neurons are 1, 0, 3, and 5 respectively, the connection data (the third output data) is "1011" and the second output data are 1, 3, and 5.

As shown in Fig. b of FIG. 3, the first input data includes the input neurons i1, i2, i3 and i4, and the second input data are weights. For the output neuron o1, the weights are $w_{11}$, $w_{21}$, $w_{31}$, and $w_{41}$; for the output neuron o2, the weights are $w_{12}$, $w_{22}$, $w_{32}$, and $w_{42}$, in which all the values of the weights $w_{21}$, $w_{12}$, and $w_{42}$ are 0. The sparse processing unit 1011 determines that the input neurons i1, i3, and i4 are connected with the output neuron o1, and the input neurons i2 and i3 are connected with the output neuron o1. The connection data between the output neuron o1 and the input neuron is "021", in which the first number "0" in the connection data represents that the value of distance between a first input neuron connected with the output neuron o1 and a first input neuron is 0, which means that the first input neuron connected with the output neuron o1 is the input neuron i1; the second number "2" in the connection data represents that the value of distance between a second input neuron connected with the output neuron o1 and the first input neuron connected with the output neuron o1 (the input neuron i1) is 2, which means that the second input neuron connected with the output neuron o1 is the input neuron i3; and the third number "1" in the connection data represents that the value of distance between a third input neuron connected with the output neuron o1 and the second input neuron connected with the output neuron o1 is 1, which means that the third input neuron connected with the output neuron o1 is the input neuron i4.

The connection data between the output neuron o2 and the input neuron is "11", in which the first number "1" in the connection data represents that the value of distance between a first input neuron connected with the output neuron o2 and the first input neuron (the input neuron i1) is 1, which means that the first input neuron connected with the output neuron o2 is the input neuron i2, and the second number "1" in the connection data represents that the value of distance between a second input neuron connected with the output neuron o2 and the first input neuron connected with the output neuron o2 is 1, which means that the second input neuron connected with the output neuron o2 is the input neuron i3.

For the output neuron o1, the mapping unit 101 takes the i1 and $w_{11}$, i3 and $w_{31}$, i4 and $w_{41}$ as a data set respectively, and stores the data set into the storage unit 102; for the output neuron o2, the mapping unit 101 takes the i2 and $w_{22}$, and i3 and $w_{32}$ as a data set respectively, and stores the data set in the storage unit 102.

For the output neuron o1, the second output data are $w_{11}$, $w_{31}$, and $w_{41}$; and for the output neuron o2, the second output data are $w_{22}$ and $w_{32}$.

When the second input data are the input neurons i1, i2, i3, and i4, and the values of the input neurons are 1, 0, 3, and 5 respectively, the connection data (the third output data) is "021" and the second output data are 1, 3, and 5.

When the first input data is the input neuron, the second input data is the weight, and the third input data is the connection data between the output neuron and the input neuron. The first data processing unit 1012 is configured to receive input neurons, delete the input neurons whose absolute values are smaller than or equal to the second threshold in the input neurons, and select the input neuron related to the weights from the deleted input neurons according to the connection data to output as the first output data.

For example, assuming that the first threshold is 0, the values of the input neurons i1, i2, i3, and i4 are 1, 0, 3, and 5 respectively. For the output neurons o1, the third output data (the connection data) is "021", and the second output data are $w_{11}$, $w_{31}$, and $w_{41}$. The first data processing unit 1012 deletes the input neuron whose value is 0 in the input neurons i1, i2, i3, and i4 to obtain the input neurons i1, i3, and i4. The first data processing unit 1012 determines that the input neurons i1, i3, and i4 are all connected with the output neuron according to the third output data "021". Therefore, the data processing unit 1012 takes the input neurons i1, i3, and i4 as the first output data to output, which means to output 1, 3, and 5.

When the first input data is the weight and the second input data is the input neuron, the third output data is the connection data of the input neuron. After the first data processing unit 1012 receives the weights $w_{11}$, $w_{21}$, $w_{31}$, and $w_{41}$, delete the weight whose absolute value is smaller than the first threshold in the weight, and select the weight related to the input neuron from the deleted weight according to the connection data to output as the first output data.

For example, assuming the second threshold is 0, the values of the weights $w_{11}$, $w_{21}$, $w_{31}$, and $w_{41}$ are 1, 0, 3, and 4 respectively. For the output neuron o1, the third output data (the connection data) is "1011", and the second output data are i1, i3, and i5. The first data processing unit 1012 deletes the input neuron whose value is 0 in the weights $w_{11}$, $w_{21}$, $w_{31}$, and $w_{41}$ to obtain the weights $w_{11}$, $w_{21}$, $w_{31}$ and $w_{41}$. The first data processing unit 1012 determines the value of the input neuron i2 in the input neurons i1, i2, i3, and i4 as 0 according to the third output data "1011". Therefore, the first data processing unit 1012 outputs the input neurons 1, 3, and 4 as the first output data.

In an example, the third input data and the fourth input data are the at least one weight and the at least one input neuron respectively. The mapping unit 101 determines the position of the input neuron whose absolute value is greater than the first threshold in the at least one input neuron, and obtains the connection data of the input neuron; the mapping unit 101 determines the position of the weight whose absolute value is greater than the second threshold in the at least one weight, and obtains the connection data of the weight. The mapping unit 101 obtains new connection data according to the connection data of the weight and the connection data of the input neuron, in which the new connection data represents the relationship between the input neuron whose absolute value is greater than the first threshold in the at least one input neuron and the output neuron, and the value of the corresponding weights. The mapping unit 101 obtains the processed input neurons and the processed weights according to the new connection data, the at least one input neuron, and the at least one weight.

Furthermore, the mapping unit 101 stores the processed input neurons and the processed weights in the storage unit 102 in the one-to-one corresponding format.

Specifically, the method of the mapping unit 101 storing the processed input neuron and the processed weight in the storage unit 102 in the one-to-one corresponding format refers to taking each of the processed input neurons and the corresponding processed weight as a data set, and then storing the data set in the storage unit 102.

When the mapping unit 101 includes the first sparse processing unit 1011 and the first data processing unit 1012, the sparse processing unit 1011 in the mapping unit 101 performs sparse processing on the input neurons or the weights to reduce the count of the weights or the input neurons, which may reduce the count of operations performed by the operation unit and improve operating efficiency.

Figure 4:
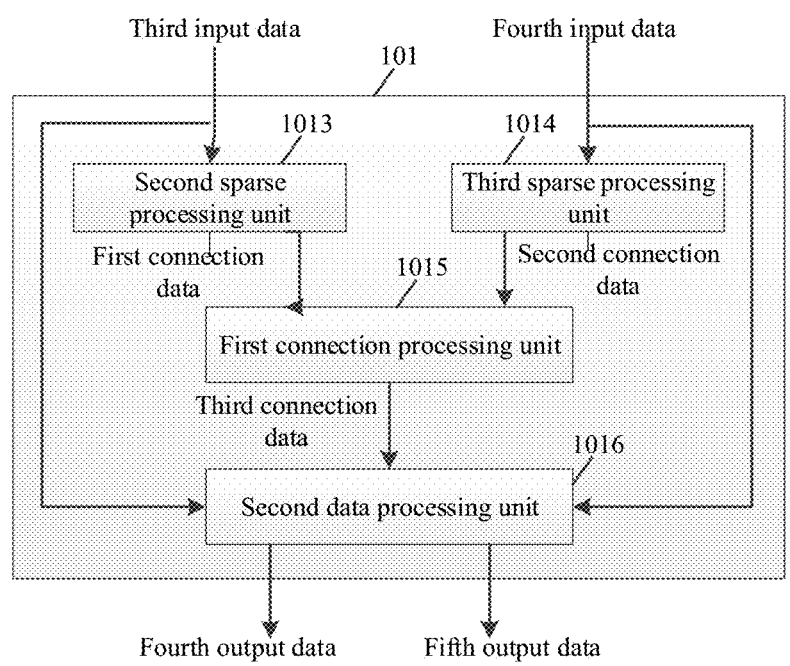
FIG. 4 is a schematic diagram of a partial structure of another neural network operation module according to an example of the present disclosure.

Specifically, as shown in FIG. 4, the mapping unit 101 includes:

a second sparse processing unit 1013 configured to receive third input data, obtain first connection data according to the third input data, and transmit the first connection data to a connection processing unit 1015;

a third sparse processing unit 1014 configured to receive fourth input data, obtain second connection data according to the fourth input data, and transmit the second connection data to the connection processing unit 1015;

the connection processing unit 1015 configured to obtain third connection data according to the first connection data and the second connection data, and transmit the third connection data to a second data processing unit 1016; and the second data processing unit 1016 configured to process the third input data and the fourth input data according to the third connection data after receiving the third input data, the fourth input data, and the third connection data to obtain fourth output data and fifth output data.

When the third input data includes the at least one input neuron and the fourth input data includes the at least one weight, the first connection data is the connection data of the input neuron, the second connection data is the connection data of the weight, the fourth output data is the processed input neuron, and the fifth output data is the processed weight; when the third input data includes the at least one weight and the fourth input data includes the at least one input neuron, the first connection data is the connection data of the weight, the second connection data is the connection data of the input neuron, the fourth output data is the processed weight, and the fifth output data is the processed input neuron.

When the third input data includes the at least one input neuron, the first connection data is a string configured to represent the position of the input neuron whose absolute value is greater than the first threshold in the at least one input neuron; when the third input data includes the at least one weight, the first connection data is a string configured to represent whether the input neuron and the output neuron are connected.

When the fourth input data includes the at least one input neuron, the second connection data is a string configured to represent the position of the input neuron whose absolute value is greater than the first threshold in the at least one input neuron; when the fourth input data includes the at least one weight, the second connection data is a string configured to represent whether the input neuron and the output neuron are connected.

It should be noted that the first connection data, the second connection data, and the third connection data may be represented in the form of stride index or direct index. The details are shown in the descriptions.

Specifically, the connection processing unit 1015 processes the first connection data and the second connection data to obtain the third connection data. The third connection data may be represented in the form of stride index or direct index.

Specifically, when the first connection data and the second connection data are represented in the form of direct index, the connection processing unit 1015 performs an AND operation on the first connection data and the second connection data to obtain the third connection data, in which the third connection data is represented in the form of direct index.

It should be noted that the strings representing the first connection data and the second connection data are stored in memory in an order of physical address either from high to low or from low to high.

When the first connection data and the second connection data are both represented in the form of stride index and the strings representing the first connection data and the second connection data are stored in the order of physical address from low to high, the connection processing unit 1015 adds each element in the string of the first connection data and an element which is stored in a physical address lower than the physical address storing the element together to obtain new elements, in which the new elements compose fourth connection data; similarly, the connection processing unit 1015 performs the same operation on the string of the second connection data to obtain fifth connection data; then the connection processing unit 1015 selects the same elements from the string of the fourth connection data and the string of the fifth connection data, and sorts the elements in an order of element values from small to large to form a new string; the connection processing unit 1015 performs a subtraction on each element in the new string and an element (adjacent to the element) whose value is smaller than the value of the element to obtain a new element; and performs corresponding operations on each element in the new string according to the method to obtain the third connection data.

For example, assuming that the first connection data and the second connection data are represented in the form of stride index, the string of the first connection data is "01111" and the string of the second connection data is "022", and the connection processing unit 1015 adds each element in the string of the first connection data and an adjacent previous element together to obtain the fourth connection data "01234"; similarly, the fifth connection data obtained by the connection processing unit 1015 performing the same processing on the string of the second connection data is "024"; the connection processing unit 1015 selects the same elements from the fourth connection data "01234" and the fifth connection data "024" to obtain a new string "024"; and the connection processing unit 1015 performs the subtraction on each element in the new string and an adjacent previous element, which refers to 0, (2-0), (4-2), to obtain the third connection data "022".

When any of the first connection data and the second connection data is represented in the form of stride index and the other is represented in the form of direct index, the connection processing unit 1015 converts the connection data represented in the form of stride index into data represented in the form of direct index or converts the connection data represented in the form of direct index into data represented in the form of stride index, then the connection processing unit 1015 processes the first connection data and the second connection data according to the method to obtain the third connection data.

Alternatively, when the first connection data and the second connection data are both represented in the form of direct index, the connection processing unit 1015 converts both the first connection data and the second connection data into the connection data represented in the form of stride index, and then processes the first connection data and the second connection data according to the method to obtain the third connection data.

Specifically, the third input data and the fourth input data may be the input neuron or the weight, and the third input data and the fourth input data are inconsistent. The second data processing unit 1016 selects the data related to the third connection data from the third input data (the input neuron or the weight) as the fourth output data according to the third connection data; and the second data processing unit 1016 selects the data related to the third connection data from the fourth connection data as the fifth output data according to the third connection data.

Furthermore, the second data processing unit 1016 takes each of the processed input neurons and the corresponding processed weight as a data set, and stores the data set in the storage unit 102.

For example, assuming that the third input data includes the input neurons i1, i2, i3, and i4, the fourth input data includes the weights $w_{11}$, $w_{21}$, $w_{31}$, and $w_{41}$, and the third connection data is represented as "1010" in the form of direct index, then the fourth output data output by the second data processing unit 1016 is the input neurons i1 and i3, and the fifth output data are the weights $w_{11}$ and $w_{31}$. The second data processing unit 1016 takes the input neuron i1 and the weight $w_{11}$, and the input neuron i3 and the weight $w_{31}$ as a data set respectively, and stores the data set in the storage unit 102.

When the mapping unit 101 includes the second sparse processing unit 1013, the third sparse processing unit 1014, the connection processing unit 1015, and the second data processing unit 1016, the sparse processing unit in the mapping unit 101 performs sparse processing on both the input neurons and the weights to reduce the count of the weights or the input neurons, which may reduce the count of operations performed by the operation unit and improve operating efficiency.

Alternatively, before the mapping unit 101 processes the input data, the mapping unit 101 may be further configured to:
  group the least one input neuron to obtain M groups of the input neurons, in which the M is an integer greater than or equal to 1;
  determine whether each group of the input neurons in the M groups of the input neurons satisfies a first preset condition, in which the first preset condition includes that the count of the input neuron whose absolute value is smaller than or equal to the third threshold in a group of the input neurons is smaller than or equal to the fourth threshold;
  when any group of the input neurons in the M groups of the input neurons does not satisfy the first preset condition, delete the group of the input neurons;
  group the at least one weight to obtain N groups of the weights, in which the N is an integer greater than or equal to 1;
  determine whether each group of the weights in the N groups of the weights satisfies a second preset condition, in which the second preset condition includes that the count of the weight whose absolute value is smaller than or equal to a fifth threshold in a group of the weights is smaller than or equal to a sixth threshold;
  when any group of the weights in the N groups of the weights does not satisfy the second preset condition, delete the group of the weights.

Alternatively, the third threshold may be 0.5, 0.2, 0.1, 0.05, 0.025, 0.0, 0, or other values.

The fourth threshold is related to the count of the input neurons in the group of the input neurons. Alternatively, the fourth threshold=the count of the input neurons in a group of the input neurons−1, or the fourth threshold may be another value.

Alternatively, the fifth threshold may be 0.5, 0.2, 0.1, 0.05, 0.025, 0.01, 0, or other values.

The sixth threshold is related to the count of the weights in the group of the weights. Optionally, the sixth threshold=the count of the weights in a group of the weights−1, or the sixth threshold may be another value.

It should be noted that the third threshold and the fifth threshold may be identical or different, and the fourth threshold and the sixth threshold may be identical or different.

The storage unit 102 is configured to store the processed input neurons, the processed weights, and a neural network instruction.

The direct memory access unit 103 is configured to read/write data between the storage unit 102 and the instruction caching unit 104, the first input caching unit 105, the second input caching unit 106, or the output caching unit 109.

Specifically, the direct memory access unit 103 reads the neural network instruction from the storage unit 102 and writes the neural network instruction into the instruction caching unit 104. The direct memory access unit 103 reads the processed input neurons and the processed weights from the storage unit 102, and writes the input neurons and the processed weights into the first input caching unit 105 and the second input caching unit 106 respectively, or into the input caching unit 106 and the second input caching unit 106 respectively.

The instruction caching unit 104 is configured to cache the neural network instructions read by the direct memory access unit 103.

The first input caching unit 105 is configured to cache the processed input neurons or the processed weights read by the direct memory access unit 103.

The second input caching unit 106 is configured to cache the processed input neurons or the processed weights read by the direct memory access unit 103.

It should be noted that when the first input caching unit 105 is configured to cache the processed input neurons, the second input caching unit 106 is configured to cache the processed weights; and when the second input caching unit 105 is configured to cache the processed weights, the first input caching unit 106 is configured to cache the processed weights.

It should be noted that the first threshold, the second threshold, the third threshold, the fourth threshold, the fifth threshold, and the sixth threshold may all be stored in the storage unit 102, the first output caching unit 105, or the second input caching unit 106; some of the first threshold, the second threshold, the third threshold, the fourth threshold, and the fifth threshold are stored in the storage unit 102, some are stored in the first output caching unit 105, and some are stored in the second output caching unit 106.

The instruction control unit 107 is configured to obtain the neural network instruction from the instruction caching unit 104 and decode the neural network instruction into a microinstruction performed by the operation unit 108.

The computation unit 108 obtains the processed input neurons and the processed weights from the first input caching unit 105 and the second input caching unit 106, performs an artificial neural network operation on the processed weights and the processed input neurons according to the microinstruction to obtain an operation result, and stores the operation result in the output caching unit 109, in which the output caching unit 109 stores the operation result in the storage unit 102 through the direct memory access unit 103.

It should be noted that the instruction caching unit 104, the first input caching unit 105, the second input caching unit 106, and the output caching unit 109 may all be an on-chip cache.

Furthermore, the operation unit 108 includes, but is not limited to, a multiplier, one or more adders (alternatively, the adders may compose an addition tree), and an activation function unit/an activation function operator. The multiplier multiplies the input data 1 (in1) and the input data 2 (in2) to obtain the output data (out1), and the operation in the first part may be represented by out=in1*in2; the addition tree performs an addition operation step by step on the third input data (in3) through the addition tree to obtain the second output data (out2), in which the in3 is a vector of length N and N is greater than one, and the operation in the second part may be represented by out2=in3 [1]+in3 [2]+ . . . +in3

[N]; and/or the addition tree performs the addition operation step by step on the third input data (in3) and then adds the result to the fourth input data (in4) to obtain the second output data (out2), and the operation may be represented by out2=in3[1]+in3[2]+ . . . +in3[N]+in4; or the addition tree adds the third input data (in3) and the fourth input data (in4) together to obtain the second output data (outs), and the operation may be represented by out2=in3+in4; the activation function unit performs an activation function (active) operation on the fifth input data (in5) to obtain the third output data (out3) and the operation may be represented by out3=active(in5), in which the activation function (active) may be one of functions sigmoid, tanh, relu, softmax, and the like. In addition to the activation operation, the activation function unit may implement other nonlinear functions, such as performing an operation on the input data (in) through a function (f) to obtain the output data (out), and the operation may be represented by out=f (in).

The operation unit 108 may further include a pooling unit, in which the pooling unit is configured to perform a pooling operation on the input data (in) to obtain the output data (out), and the operation may be represented by out=pool(in). The function pool refers to a pooling operation, in which the pooling operation includes, but is not limited to, average pooling, maximum pooling, and median pooling. The input data (in) is data in a pooled core associated with output (out).

It may be seen that in the scheme of the examples of the present disclosure, the sparse processing unit in the mapping unit processes the input neurons and the weights, deletes the input neuron and the weight whose absolute value is smaller than or equal to the threshold, reduces the count of the input neurons and the weight, which may reduce additional overhead; and the operation unit performs the artificial neural network operation according to the processed input neurons and the processed weights, which may improve operating efficiency.

It should be noted that the neural network operation module may not only perform a sparse neural network operation, but also perform a dense neural network operation. The neural network operation module is suitable for the sparse neural network operation, because the sparse neural network includes a large amount of data whose value is 0 or absolute value is small. The data may be deleted through the mapping unit, which may improve the operating efficiency under a condition of assuring operation precision.

Figure 5A:
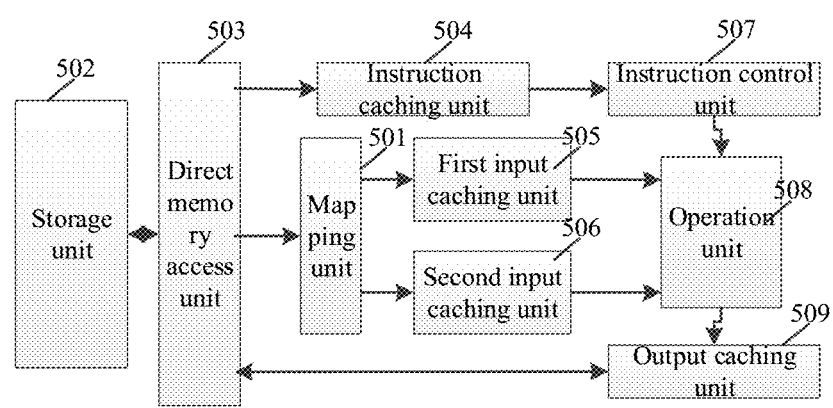
FIG. 5a is a schematic diagram of another neural network operation module according to an example of the present disclosure.

FIG. 5a is a schematic structural diagram of another neural network operation module according to an example of the present disclosure. As shown in FIG. 5a, the neural network operation module includes a storage unit 502, a direct memory access unit 503, a mapping unit 501, an instruction caching unit 504, a first input caching unit 505, a second input caching unit 506, an instruction control unit 507, an operation unit 508, and an output caching unit 509. The storage unit 501 is connected with the direct memory access unit 503, and the direct memory access unit 503 is connected with the instruction caching unit 504, the mapping unit 501, and the output caching unit 509; the instruction caching unit 504 is connected with the instruction control unit 507, both the first input caching unit 505 and the second input caching unit 506 are connected with the instruction control unit 507, both the first input caching unit 505 and the second input caching unit 506 are connected with the operation unit 508, and the operation unit 508 is connected with the instruction control unit 507 and the output caching unit 509.

The storage unit 502 is configured to store the input data, the neural network instruction and the operation result, in which the input data includes the at least one input neuron and the at least one weight.

The direct memory access unit 503 is configured to read/write the data between the storage unit 502 and the instruction caching unit 504, the mapping unit 501 or the output caching unit 509.

Specifically, the direct memory access unit reads the neural network instruction from the storage unit 502 and writes the neural network instruction into the instruction caching unit 504. The direct memory access unit 503 reads the input neuron and the weight from the storage unit 502 and writes the input neuron and the weight to the mapping unit 501. The direct memory access unit 503 reads the operation result from the output caching unit 509 and writes the operation result into the storage unit 502.

The mapping unit 501 is configured to obtain the input data through the direct memory access unit 503, process the input data to obtain the processed input data, in which the processed input data includes the processed input neurons and the processed weights, and then store the processed input neurons and the processed weights in the first input caching unit 505 and the second input caching unit 506.

Specifically, the mapping unit 501 stores the processed input neurons and the processed weights in the first input caching unit 505 and the second input caching unit 506 respectively, or in the second input caching unit 506 and the first input caching unit 505 respectively.

It should be noted that specific functionalities of the mapping unit 501 will not be described further. For details, refer to the relevant description of the mapping unit 101 (including the second sparse processing unit 1013, the third sparse processing unit 1014, the connection processing unit 1015, and the second data processing unit 1016) in the example shown in FIG. 1b. In the example, the first input data and the second input data are consistent with the third input data and the fourth input data in the example shown in FIG. 1b respectively, and the first output data and the second output data in the example are consistent with the fourth output data and the fifth output data in the example shown in FIG. 1b respectively.

The first input caching unit 505 is configured to cache a first cache data, in which the first cache data is the processed input neuron or the processed weight.

The second input caching unit 506 is configured to cache a second cache data, in which the second cache data is the processed input neuron or the processed weight, and the second cache data is inconsistent with the first cache data.

The instruction caching unit 504 is configured to cache the direct memory access unit 503 to read the neural network instruction.

The instruction control unit 507 is configured to obtain the neural network instruction from the instruction caching unit 504 and decode the neural network instruction into the microinstruction performed by the operation unit 508.

The operation unit 508 is configured to obtain the processed input neuron and the processed weight from the first input caching unit 505 and the second input caching unit 506, and then perform the artificial neural network operation on the processed input neuron and the processed weight according to the microinstruction to obtain the operation result.

It should be noted that the functionalities of the operation unit 508 will not be described further here. For the details, refer to the relevant description of the operation unit 108 shown in FIG. 1b.

The output caching unit 509 is configured to cache the operation result.

It should be noted that the first threshold, the second threshold, the third threshold, the fourth threshold, the fifth threshold, and the sixth threshold may all be stored in the storage unit 502, the first output cache 505, or the second input cache 506; some of the first threshold, the second threshold, the third threshold, the fourth threshold, the fifth threshold, and the sixth threshold may be stored in the storage unit 502, some may be stored in the first output cache 505, and some may be stored in the second output cache 506.

It should be pointed out that the instruction caching unit 504, the first input caching unit 505, the second input caching unit 506, and the output caching unit 509 may all be the on-chip cache.

Figure 5B:
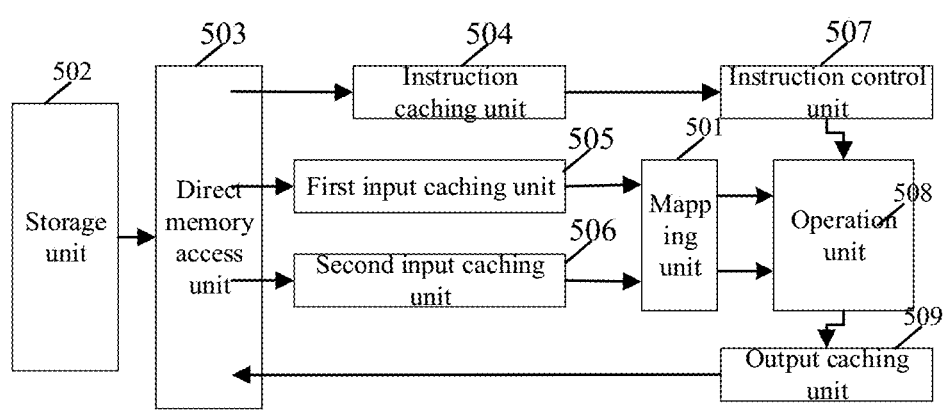
FIG. 5b is a schematic structural diagram of another neural network operation module according to an example of the present disclosure.

In an example, as shown in FIG. 5b, the mapping unit 501 is positioned between the input caching unit (including the first input caching unit 505 and the second input caching unit 506) and the operation unit 508, which means that the first input caching unit 505 and the second input caching unit 506 are connected with the mapping unit 501, and the mapping unit 501 is connected with the operation unit 508. The first input caching unit 505 and the second input caching unit 506 obtain the first input data and the second input data respectively from the storage unit 502 through the direct memory access unit, in which both the first input data and the second input data include the at least one input neuron or the at least one weight, and the first input data and the second input data are inconsistent. The mapping unit 501 is configured to obtain the input neuron and the weight from the first input caching unit 505 and the second input caching unit 506, and then process the input neuron and weight to obtain the processed input neuron and the processed weight. The specific processing will not be described further here. For details, refer to the relevant description of the mapping unit 101 in FIG. 1b. The mapping unit 501 transmits the processed weights and the processed input neurons to the operation unit 509.

It may be seen that in the scheme of the examples of the present disclosure, the fourth sparse processing unit and the fifth sparse processing unit in the mapping unit process the input neurons and the weights respectively to obtain the first connection data and the second connection data respectively. The second connection processing unit processes the first connection data and the second connection data to obtain the third connection data. The third data processing unit processes the first input data according to the third connection data to obtain the first output data to output, and processes the second input data according to the third connection data to obtain the second output data to output. By processing the input neuron and the weight to obtain the processed input neuron and the weight, the amount of input data may be reduced, which may reduce the total amount of operation, improve the operating speed, and reduce the additional overhead.

It should be noted that the neural network operation module may not only perform the sparse neural network operation, but also perform the dense neural network operation. The neural network operation module is suitable for the sparse neural network operation, because the sparse neural network includes a large amount of data whose value is 0 or absolute value is small. The data may be deleted through the mapping unit, which may improve the operating efficiency under the condition of assuring operation precision.

Figure 6A:
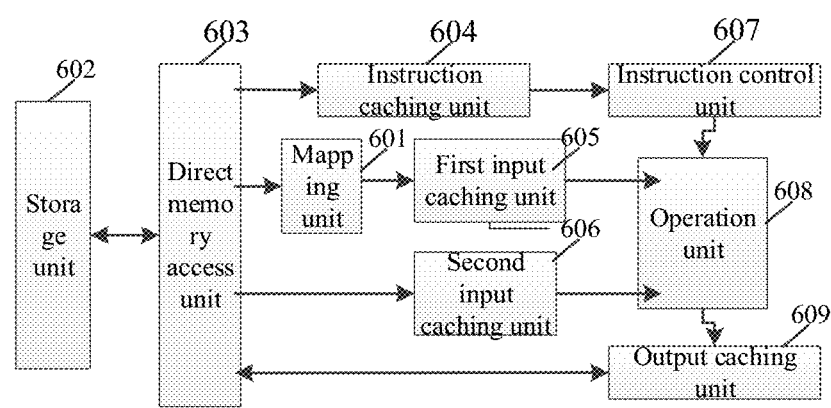
FIG. 6a is a schematic structural diagram of another neural network operation module according to an example of the present disclosure.
Figure 6B:
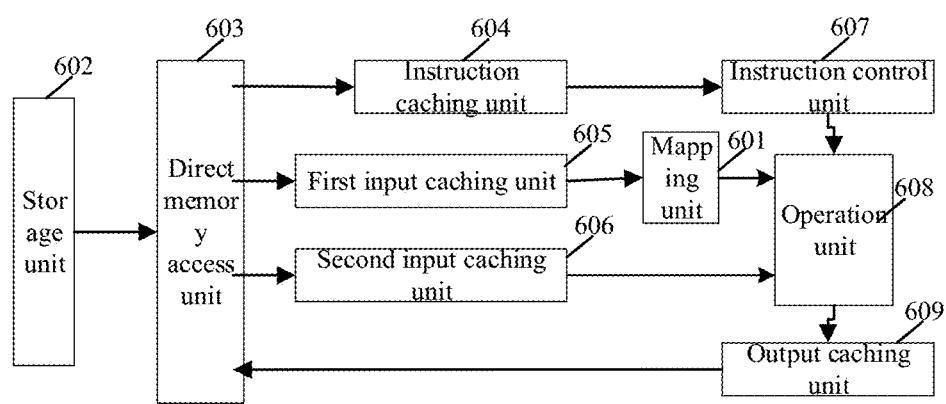
FIG. 6b is a schematic structural diagram of another neural network operation module according to an example of the present disclosure.

FIG. 6a is a schematic structural diagram of another neural network operation module according to an example of the present disclosure. As shown in FIG. 6a, the neural network operation module includes a storage unit 602, a direct memory access unit 603, a mapping unit 601, an instruction caching unit 604, a first input caching unit 605, a second input caching unit 606, an instruction control unit 607, an operation unit 608, and an output caching unit 609. The storage unit 601 is connected with the direct memory access unit 603, in which the direct memory access unit 603 is connected with the instruction caching unit 604, the mapping unit 601, the second input caching unit 606, and the output caching unit 609; and the instruction caching unit 604 is connected with the instruction control unit 607, the first input caching unit 605 is connected with the mapping unit 601, and both the first input caching unit 605 and the second input caching unit 606 are connected with the operation unit 608, in which the operation unit 608 is connected with the instruction control unit 607 and the output caching unit 609.

The storage unit 602 is configured to store the first input data and the connection data of the first input data, the processed second input data, the neural network instruction, and the operation result. The first input data is the input neuron or the weight, the connection data of the first input data is the connection data of the input neuron or the connection data of the weight, and the processed second input data is the processed input neuron or the processed weight.

The direct memory access unit 603 is configured to read/write data between the storage unit 602 and the instruction caching unit 604, the mapping unit 601, the first input caching unit 605, or the output caching unit 609.

Specifically, the direct memory access unit 603 is configured to read the neural network instruction from the storage unit 602 and write the neural network instruction into the instruction caching unit 604;

read the input neuron and the connection data of the input neuron from the storage unit 602 and write the input neuron and the connection data of the input neuron into the mapping unit 601; read the processed weight from the storage unit 602 and write the weight into the second input caching unit 606; or read the weight and the connection data of the weight from the storage unit 602 and write the weight and the connection data of the weight into the mapping unit 601; read the processed input neuron from the storage unit 602 and write the processed input neuron into the second input caching unit 606; or read the operation result from the output caching unit 609 and write the operation result into the storage unit 602.

Figure 7:
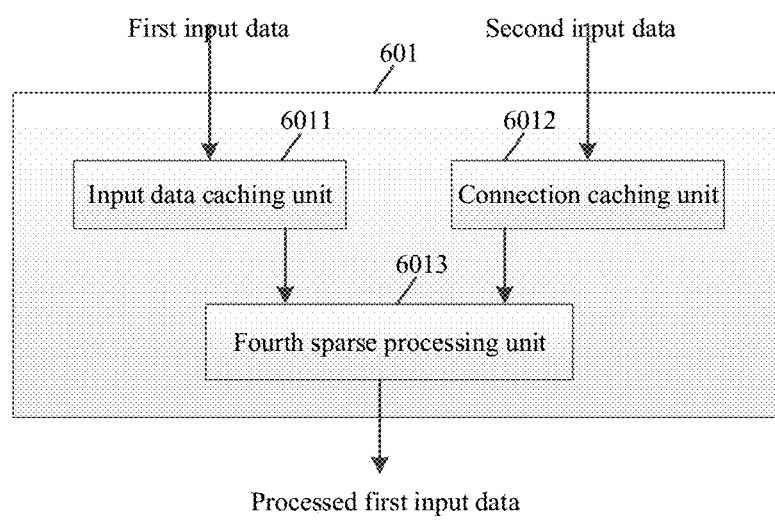
FIG. 7 is a schematic diagram of a partial structure of another neural network operation module according to an example of the present disclosure.

As shown in FIG. 7, the mapping unit 601 includes:

an input data caching unit 6011 configured to cache the first input data, in which the first input data includes the at least one input neuron or the at least one weight; and a connection caching unit 6012 configured to cache the connection data of the first input data, which refers to the connection data of the input neuron or the connection data of the weight.

The connection data of the input neuron is a string configured to represent whether the absolute value of the input neuron is smaller than or equal to the first threshold. The connection data of the weight is a string configured to represent whether the absolute value of the weight is smaller than or equal to the first threshold, or a string configured to represent whether the input neuron corresponding to the weight is connected with the output neuron of the weight. The connection data of the input neuron and the connection data of the weight may be represented in the form of direct index or stride index.

It should be noted that for the description of the direct index and stride index, refer to the relevant description of the example shown in FIG. 1b.

The mapping unit 601 further includes:

a fourth sparse processing unit 6013 configured to process the first input data according to the connection data of the first input data to obtain the processed first input data, and store the processed first input data into the first input caching unit 605.

When the first input data is the at least one input neuron, the fourth sparse processing unit 6013 processes one input neuron and one connection in one clock cycle, which means to select one valid input neuron from S1 input neurons in one clock cycle, in which the S1 is an integer greater than 1.

In an example, the fourth sparse processing unit 6013 processes a plurality of input neurons and a plurality of connection data in one clock cycle, which means to select S2 valid input data from the S1 input neurons, in which the S2 is an integer greater than 0 and smaller than or equal to the S1.

Figure 8:
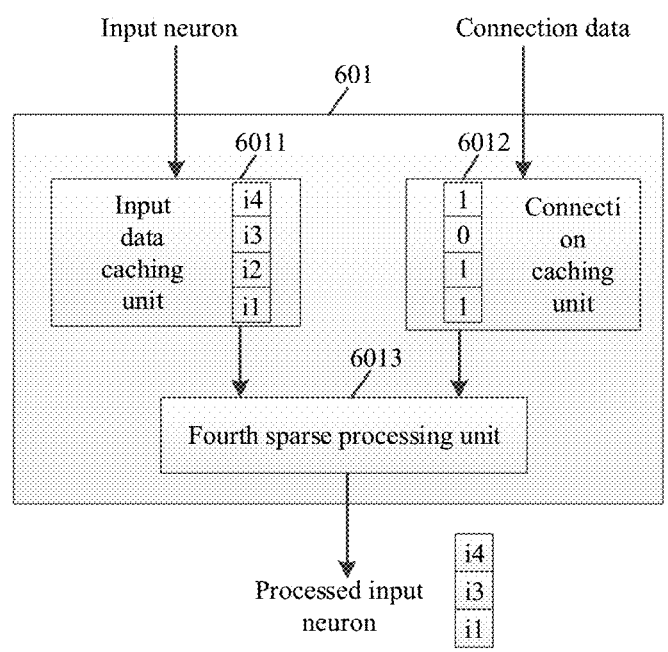
FIG. 8 is a schematic diagram of a partial structure of another neural network operation module according to an example of the present disclosure.

For example, as shown in FIG. 8, the input neurons are i1, i2, i3, and i4, and the connection data represented in the form of direct index is "1011", and the fourth sparse processing unit 6013 may select one connected (valid) input neuron from four input neurons in one clock cycle. After the fourth sparse processing unit 6013 obtains the input neurons i2, i3, and i4 and the connection data 1011 from the input data caching unit 6011 and the connection caching unit 6012 respectively, the fourth sparse processing unit 6013 selects the connected input neurons i1, i3, and i4 from the input neurons i1, i2, i3, and i4 according to the connection data "1011". Since the fourth sparse processing unit 6013 may select one connected (valid) input neuron from four input neurons in one clock cycle, the fourth sparse processing unit 6013 outputs the input neurons i1, i2, i3, and i4 in turn in three clock cycles, as shown in FIG. 8. The fourth sparse processing unit 6013 stores the input neurons i1, i3, and i4 into the first input caching unit 605.

Figure 9:
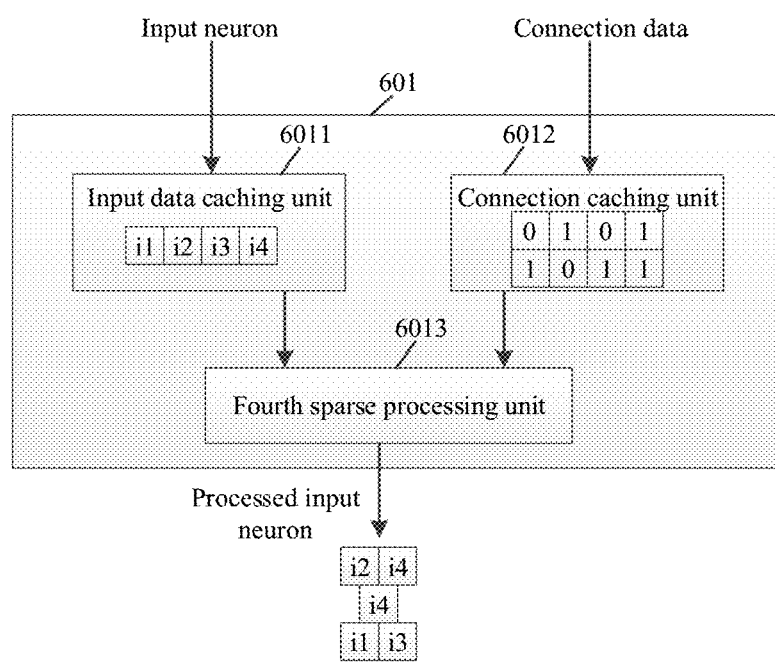
FIG. 9 is a schematic diagram of a partial structure of another neural network operation module according to an example of the present disclosure.

For example, as shown in FIG. 9, the input neurons are i1, i2, i3, and i4. Two groups of connection data are represented in the form of direct index, including "1011" and "0101". The fourth sparse processing unit 6013 may select two connected (valid) input neurons from four input neurons in one clock cycle. The fourth sparse processing unit 6013 selects the connected input neurons i1, i3, and i4 from the input neurons i1, i2, i3, and i4 according to the connection data "1011", and selects the connected input neurons i2 and i4 from the input neurons i1, i2, i3, and i4 according to the connection data "0101". Since the fourth sparse processing unit 6013 may select two connected (valid) input neurons from four input neurons in one clock cycle, for the connection data "1011", the fourth sparse processing unit 6013 selects the input neurons i1 and i3 in a first clock cycle, stores the neurons i1 and i3 in the first input caching unit 605, and selects the input neuron i4 in a second clock cycle and stores the input neuron i4 in the first input caching unit 605; for connection data "0101", the fourth sparse processing unit 6013 selects the input neurons i2 and i4 in one clock cycle, as shown in FIG. 9. The fourth sparse processing unit 6013 stores the input neurons i2 and i4 in the first input caching unit 605.

Figure 10:
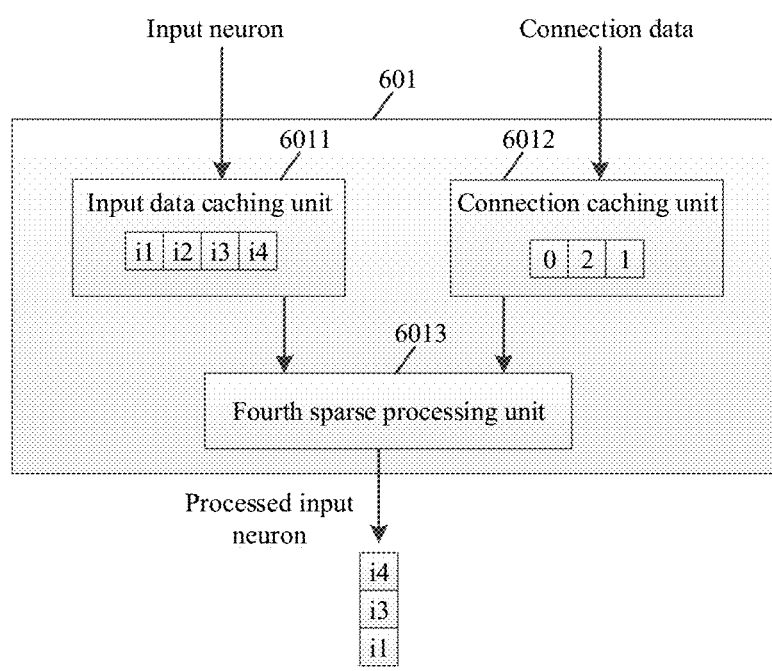
FIG. 10 is a schematic diagram of a partial structure of another neural network operation module according to an example of the present disclosure.

For example, as shown in FIG. 10, the input data are the input neurons i1, i2, i3, and i4, the connection data represented in the form of stride index is "021", and the fourth sparse processing unit 6013 may select one connected (valid) input neuron from four input neurons in one clock cycle. After the fourth sparse processing unit 6013 obtains the input neurons i1, i2, i3, and i4 and the connection data "021" from the input data caching unit 6011 and the connection caching unit 6012 respectively, the fourth sparse processing unit 6013 selects the connected input neurons i3, and i4 from the input neurons i1, i2, i3, and i4 according to the connection data "1011". Since the fourth sparse processing unit 6013 may select one connected (valid) input neuron from four input neurons in one clock cycle, the fourth sparse processing unit 6013 outputs the input neurons i1, i3, and i4 in turn in three clock cycles, as shown in FIG. 10. The fourth sparse processing unit 6013 stores the input neurons i1, i3, and i4 in the first input caching unit 605.

Figure 11:
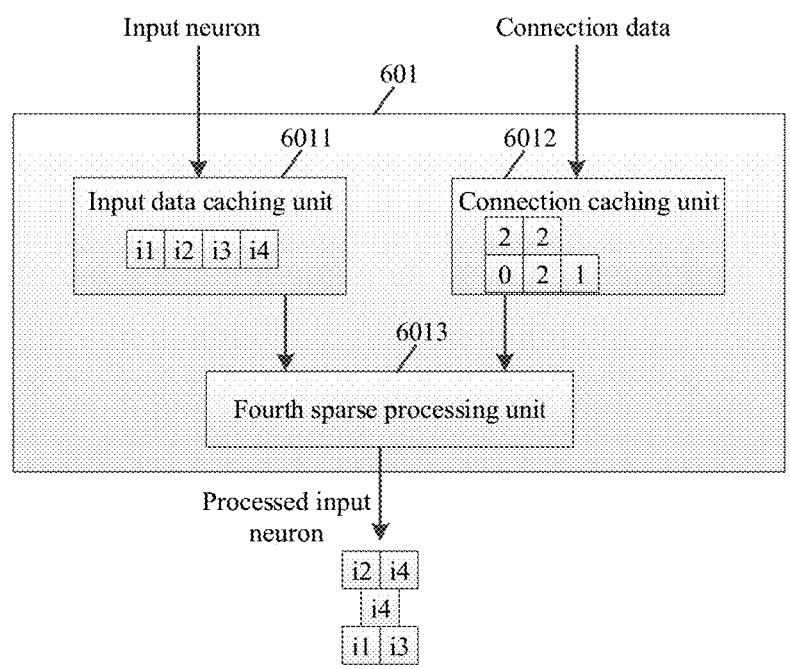
FIG. 11 is a schematic diagram of the partial structure shown in FIG. 1b, FIG. 5a, FIG. 5b, FIG. 6a, or FIG. 6b of another neural network operation module according to an example of the present disclosure.

For example, as shown in FIG. 11, the input data are the input neurons i1, i2, i3, and i4. Two groups of connection data are represented in the form of direct index, including "021" and "22". The fourth sparse processing unit 6013 may select two connected (valid) input neurons from four input neurons in one clock cycle. The fourth sparse processing unit 6013 selects the connected input neurons i1, i3, and i4 from the input neurons i1, i2, i3, and i4 according to the connection data "021", and selects the connected input neurons i2 and i4 from the input neurons i1, i2, i3, and i4 according to the connection data "22". Since the fourth sparse processing unit 6013 may select two connected (valid) input neurons from four input neurons in one clock cycle, for the connection data "021", the fourth sparse processing unit 6013 selects the input neurons i1 and i3 in the first clock cycle, stores the neurons i1 and i3 in the first input caching unit 605, and selects the input neuron i4 in a second clock cycle and stores the input neuron i4 in the first input caching unit 605; for connection data "22", the fourth sparse processing unit 6013 selects the input neurons i2 and i4 in one clock cycle to output, as shown in FIG. 11, and stores the input neurons i2 and i4 in the first input caching unit 605.

In an example, the first input data cached by the input data caching unit 6011 includes the at least one weight, and the data cached by the connection caching unit 6012 is the connection data of the weight, and when the absolute value of the at least one weight is greater than the first threshold, the fourth sparse processing unit 6013 sets the weight between the input neuron and the output neuron that are not connected with each other to 0 according to the connection data of the weight, and stores the weight whose value is 0 and the at least one weight into the second input caching unit 606.

For example, the form of the weight is $w_{ij}$, which represents the weight between the $i^{th}$ input neuron and the $j^{th}$ output neuron. If the input neurons include i1, i2, i3, and i4, and the output neuron includes o1, the first input data (the weight) are w11, w31, and w41, the connection data of the first input data (the connection data of the weight) is represented in the form of direct index, which is 1011, the fourth sparse processing unit 6013 determines that the input neuron i2 is not connected with the output neuron o1, and the fourth sparse processing unit 6013 sets the weight $w_{21}$ between the input neuron i2 and the output neuron o1 to 0, and stores $w_{11}$, $w_{21}$ (0), $w_{31}$, and $w_{41}$ in the second input caching unit 606.

The first input caching unit 605 is configured to cache the processed input neuron.

The second input caching unit 606 is configured to cache the processed weight read from the storage unit 602.

In an example, when the first input data is the at least one weight, the fourth sparse processing unit 6013 processes one weight and one connection in one clock cycle, which means to select one valid weight from S3 weights in one clock cycle, in which the S3 is an integer greater than 1.

Alternatively, the fourth sparse processing unit 6013 processes a plurality of weights and a plurality of connection data in one clock cycle, which means to select S4 valid weights from the S3 weights, in which S4 is an integer greater than 0 and smaller than or equal to the S3.

The first input caching unit 605 is configured to cache the processed weight.

The second input caching unit 606 is configured to cache the processed input neuron read from the storage unit 602.

It should be noted that the above relevant descriptions will not be described further here. For the details, refer to the relevant descriptions from FIG. 8 to FIG. 11.

Alternatively, before the mapping unit 601 processes the first input data, the mapping unit 601 is further configured to:

group the at least one input neuron to obtain M groups of the input neurons, in which the M is an integer greater than or equal to 1;

determine whether each group of the input neurons in the M groups of the input neurons satisfies the first preset condition, in which the first preset condition includes that the count of the input neuron whose absolute value is smaller than or equal to the third threshold in a group of the input neurons is smaller than or equal to the fourth threshold;

when any group of the input neurons in the M groups of the input neurons does not satisfy the first preset condition, delete the group of the input neurons;

group the at least one weight to obtain N groups of the weights, in which the N is an integer greater than or equal to 1;

determine whether each group of the weights in the N groups of the weights satisfies the second preset condition, in which the second preset condition includes that the count of the weight whose absolute value is smaller than or equal to the fifth threshold in a group of the weights is smaller than or equal to the sixth threshold; and when any group of the weights in the N groups of the weights does not satisfy the second preset condition, delete the group of the weights.

It should be noted that the above relevant descriptions will not be described further here. For the details, refer to the relevant descriptions in FIG. 1*b*.

It should be noted that the first threshold, the second threshold, the third threshold, the fourth threshold, the fifth threshold, and the sixth threshold may all be stored in the storage unit 602 or the first output caching unit 605; some of the first threshold, the second threshold, the third threshold, the fourth threshold, and the fifth threshold are stored in the storage unit 602, and some are stored in the first output caching unit 605.

The instruction control unit 607 is configured to obtain the neural network instruction from the instruction caching unit 604 and decode the neural network instruction into the microinstruction performed by the operation unit 608.

The computation unit 608 is configured to obtain the processed input neurons and the processed weights from the first input cache 605 and the second input caching unit 606, perform the artificial neural network operation on the processed weights and the processed input neurons according to the microinstruction to obtain the operation result, and store the operation result in the output caching unit 609.

The output caching unit 609 is configured to cache the operation result obtained by the operation unit 608 which performs the artificial neural network operation.

In an example, the mapping unit 601 is positioned between the first input caching unit 605 and the operation unit 608. The first input caching unit is configured to cache the first input data and the connection data of the first input data obtained by the direct memory access unit 603 from the storage unit. The mapping unit 601 obtains the first input data and the connection data of the first input data from the first input caching unit 605, and then processes the first input data according to the connection data to obtain the processed first input data. The specific process will not be described further here, for the details, refer to the relevant descriptions of the mapping unit in FIG. 6*a*. The mapping unit 601 transmits the processed first input data to the operation unit for operation.

It should be pointed out that the instruction caching unit 604, the first input caching unit 605, the second input caching unit 606, and the output caching unit 609 may all be the on-chip cache.

It should be noted that the on-chip cache in the examples shown in FIG. 1*b*, FIG. 5*a*, FIG. 5*b*, FIG. 6*a*, or FIG. 6*b* is a temporary memory positioned between the neural network operation module and the memory, which has smaller capacity but faster switching speed than the memory. The data in the on-chip cache is a small part of the data in the memory, and the neural network operation module will access the small part of the data. When the neural network operation module needs to read/write data, the neural network operation module may directly access the on-chip cache to accelerate reading/writing data.

It should be noted that the connection data of the weight in the examples shown in FIG. 1*b*, FIG. 5*a*, FIG. 5*b*, FIG. 6*a*, or FIG. 6*b* may be represented in the following forms besides direct index and stride index:

Form 1: List of Lists (LIL)

Representing the connection data of the weight in the form of LIL refers to storing the information of non-zero weights in each row of the weight matrix in a list, in which each record in the list includes a column index of non-zero weights and the value of the non-zero weights.

Figure 12:
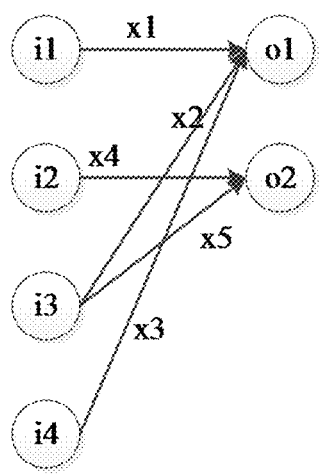
FIG. 12 is a schematic structural diagram of another neural network according to an example of the present disclosure.

For example, if the weight matrix is $$\begin{bmatrix} x1 & 0 \\ 0 & x4 \\ x2 & x5 \\ x3 & 0 \end{bmatrix},$$

the connection data of the weight matrix is represented as ((1, x1), (2, x4), ((1, x2), (2, x5), (1, x3) in the form of LIL. The connection data includes four lists to represent the weight. The count of input neurons corresponding to the matrix is 4, which are i1, i2, i3, and i4 respectively. The LIL includes at most two records, which means that the count of the output neurons corresponding to the weight matrix is 2 (o1 and o2 respectively). The record (1, x1) in the first list represents that the weight between the input neuron i1 and the output neuron of is x1, the record (2, x4) in the second list represents that the weight between the input neuron i2 and the output neuron o2 is x4, the record (1, x2) in the third list represents that the weight between the input neuron i3 and the output neuron o1 is x2, the record (2, x5) represents that the weight between the input neuron i3 and the output neuron o1 is x5, and the record (1, x3) in the fourth list represents that the weight between the input neuron i4 and the output neuron o1 is x3, Therefore, the neural network structure shown in FIG. 12 may be obtained from the LIL.

For the output neuron o1, the mapping unit outputs the weights x1, x2, and x3, which correspond to the input neurons i1, i3, and i4 respectively; for the output neuron o2, the mapping unit output the weights x4 and x5, which correspond to the input neurons i2 and i3 respectively. The mapping unit stores the weights x1, x2, x3, x4, and x5 in the first input caching unit.

Representing the connection data of the weight in the form of LIL has the following advantages: simple, capable of constructing a matrix quickly, convenient to modify (when storing and recording in an order of the size of the column index), and supporting flexible slicing operation.

Form 2: Coordinate List (COO)

The coordinate list is a list consisting of at least one tuple, in which the tuple includes a row number and a column number of a non-zero weight in the above weight matrix as well as a value of the non-zero weight. The non-zero weight corresponding to the tuple refers to a weight between an $m^{th}$ input neuron and an $n^{th}$ output neuron, in which m and n refer to the row number and the column number of the tuple respectively. A maximum row number in the tuple of the coordinate list refers to the count of input neurons corresponding to the weight matrix, and a maximum column number refers to the count of output neurons corresponding to the weight matrix.

In other words, each tuple in the coordinate list represents position information of the non-zero weight in the weight matrix.

For example, assuming the weight matrix is $$\begin{bmatrix} x1 & 0 \\ 0 & x4 \\ x2 & x5 \\ x3 & 0 \end{bmatrix},$$

the connection data of the weight matrix is represented as (1, 1, x1), (2, 2, x4), (3, 1, x2), (3, 2, x5), (4, 1, x3) in the form of COO, in which the maximum row number of the tuple in the COO is 4 and the maximum column number is 2. The count of input neurons and output neurons corresponding to the weight matrix is 4 and 2 respectively, which are input neurons i1, i2, i3, i4 and output neurons o1, o2. The weight between the input neuron i1 and the output neuron o1 is x1 according to the tuple (1, 1, x1), the weight between the input neuron i2 and the output neuron o2 is x4 according to the tuple (2, 2, x4), the weight between the input neuron i3 and the output neuron o1 is x2 according to the tuple (3, 1, x2), the weight between the input neuron i3 and the output neuron o2 is x5 according to the tuple (3, 2, x5), and the weight between the input neuron i4 and the output neuron o1 is x3 according to the tuple (4, 1, x3). The neural network structure shown in FIG. 12 can be obtained from the above coordinate list.

For the output neuron o1, the mapping unit outputs the weights x1, x2, and x3 which correspond to the input neurons i1, i3, and i4 respectively; for the output neuron o2, the mapping unit outputs the weights x4 and x5 which correspond to input neurons i2 and i3 respectively. The mapping unit stores the weights x1, x2, x3, x4, and x5 in the first input caching unit.

Representing the connection data of the weight in the form of COO has the following advantages: simple, capable of constructing a matrix quickly, and convenient to modify. The form of COO is most suitable when the matrix is particularly sparse: no matter how big a matrix is, if the matrix has only one non-zero element, only three numbers are needed to reconstruct an original matrix with the size of the original matrix, and fast conversion with other formats is supported.

Form 3: Compressed Sparse Row (CSR)

In the form of CSR, row information of the weight matrix is compressed and stored, and only the position of a first non-zero weight in each row is explicitly retained. The weight matrix is represented by the following three arrays.

A first array stores values of all non-zero weights in the weight matrix. The elements are arranged in an order of left-to-right and top-to-bottom traversal. The first array is recorded as A. The length of the first array is the count of non-zero weights in the weight matrix.

A second array stores the column index (column number) of each element of the first array A in the weight matrix respectively, so that the length of the second array is the same as that of the array A, and the array is recorded as JA.

A third array is recorded as IA, and the length of the array IA is the count of rows of the weight matrix plus 1. The elements of the array IA accumulate and store the count of non-zero weights in each row of the weight matrix, which can be obtained recursively as follows, and the count of non-zero weights in the whole weight matrix is stored in the last element of the array IA.

If a sequence number of the above three arrays and a sequence number of the weight matrix start from 0, the array IA can be defined by the following recursive methods:

$IA[0]=0$ $IA[i]=IA[i-1]$+the count of non-zero weights in the $i-1^{th}$ row of the weight matrix ($i>0$)

Figure 13:
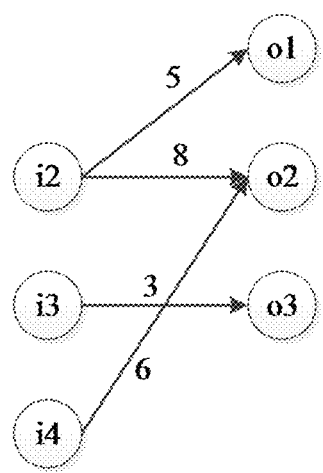
FIG. 13 is a schematic structural diagram of another neural network according to an example of the present disclosure.

For example, assuming that the weight matrix is $$\begin{bmatrix} 0 & 0 & 0 & 0 \\ 5 & 8 & 0 & 0 \\ 0 & 0 & 3 & 0 \\ 0 & 6 & 0 & 0 \end{bmatrix},$$

since the first array A stores the values of all non-zero weights in the weight matrix and the elements are arranged in an order of left-to-right and top-to-bottom traversal, the first array A=[5,8,3,6]; since the second array JA stores the column index (column number) of each element of the array A in the weight matrix, the array JA=[0,1,2,1]. In the third array IA, the count of non-zero weights of each row in the weight matrix is accumulated, and the array IA is determined to be [0,0,2,3,4] according to the above recursive method. The first array A shows the weight matrix includes four non-zero weights, which are 5, 3, 8, and 6. The second array JA shows the column index of the four non-zero weights in the weight matrix, that is, the weight 5 is in the first column of the weight matrix, the weight 8 is in the second column of the weight matrix, the weight 3 is in the third column of the weight matrix, and the weight 6 is in the second column of the weight matrix. The third array IA and the definition show that the first row of the weight matrix includes no non-zero weights, the second row includes two non-zero weights, and the third row and the fourth row include one non-zero weight respectively; according to the above information, the weight matrix can be represented as (1,0,5), (1,1,8), (2,2,3), (3,1,6) in the form of coordinate lists, and the weight matrix can be further determined. According to the form of the weight matrix, the values of the elements in the first row and the fourth column of the matrix are both 0, thus the input neurons corresponding to the matrix are i2, i3, and i4 respectively; and the output neurons corresponding to the weight matrix are o1, o2, and o3 respectively. Finally, the weight between the input neuron i2 and the output neuron o1 can be determined to be 5; the weight between the input neuron i2 and the output neuron o2 can be determined to be 8, the weight between the input neuron i3 and the output neuron o3 can be determined to be 3; the weight between the input neuron i3 and the output neuron o3 can be determined to be 6; and finally the structure of the neural network is shown in FIG. 13.

For the output neuron o1, the mapping unit outputs the weight 5 which corresponds to the input neurons i2; for the output neuron o2, the mapping unit outputs the weights 8 and 6 which correspond to input neurons i2 and i4 respectively; and for the output neuron o3, the mapping unit outputs the weights 3 which corresponds to input neurons i3. The mapping unit stores the weights 5, 8, 6, and 3 in the first input caching unit.

Compared with the form of COO, representing the connection data of the weight in the form of CSR compresses the information of row index. In the form of CSR, the average count of bytes used by non-zero elements is the most stable when storing sparse matrices.

Form 4: Compressed Sparse Column (CSC)

In the form of CSC, column information of the weight matrix is compressed and stored, and only the position of the first non-zero weight in each column is explicitly retained. The weight matrix is represented by the following three arrays.

A fourth array stores values of all non-zero weights in the weight matrix. The elements are arranged in an order of left-to-right and top-to-bottom traversal. The fourth array is recorded as A'. The length of the fourth array is the count of non-zero weights in the weight matrix.

A fifth array stores the row index (row number) of each element of the fourth array A' in the weight matrix respectively, so that the length of the second array is the same as that of the fourth array A', and the array is recorded as JA'.

A sixth array is recorded as IA', and the length of the array IA' is the count of rows of the weight matrix plus 1. The elements of the array IA' accumulate and store the count of non-zero weights in each row of the weight matrix, which can be obtained recursively as follows, and the count of non-zero weights in the whole weight matrix is accumulated in the last element of the array IA'.

If the sequence number of the above three arrays and the sequence number of the weight matrix start from 0, the array IA' can be defined by the following recursive methods:

$IA'[0]=0$ $IA'[i]=IA'[i-1]$+the count of non-zero weights in the $j-1^{th}$ column of the weight matrix ($j>0$)

Figure 14:
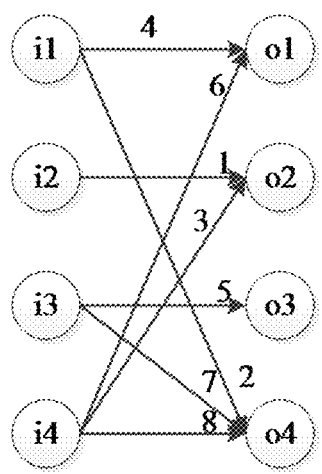
FIG. 14 is a schematic structural diagram of another neural network according to an example of the present disclosure.

For example, assuming that the weight matrix is $$\begin{bmatrix} 4 & 0 & 0 & 2 \\ 0 & 1 & 0 & 0 \\ 0 & 0 & 5 & 7 \\ 6 & 3 & 0 & 8 \end{bmatrix},$$

since the fourth array A' stores the values of all non-zero weights in the weight matrix and the elements are arranged in an order of left-to-right and top-to-bottom traversal, the array A'=[4,6,1,3,5,2,7,8]; since the fifth array JA' stores the row index (row number) of each element of the array A' in the weight matrix, the array JA'=[0,3,1,3,2,0,2,3]; and the array IA' is determined to be [0,2,4,5,8] according to the above recursive method. The first array A' shows the weight matrix includes eight non-zero weights, which are 4, 6, 1, 3, 5, 2, 7, and 8. The second array JA' shows the row index of the eight non-zero weights in the weight matrix: the weight 4 is in the first row of the weight matrix, the weight 6 is in the fourth row of the weight matrix, the weight 1 is in the second row of the weight matrix, the weight 3 is in the fourth column of the weight matrix, the weight 5 is in the third row of the weight matrix, the weight 2 is in the first row of the weight matrix, the weight 7 is in the third row of the weight matrix, and the weight 8 is in the fourth row of the weight matrix. The array IA' and the definition show that both the first column and the second column of the weight matrix include two non-zero weights, the third column includes one non-zero weight, and the fourth row includes three non-zero weights; according to the above information, the weight matrix can be represented as (0,0,4), (3,0,6), (1,1,1), (3,1,3), (2,2,5), (0,3,2), (2,3,7), (3,3,8) in the form of coordinate lists, and the weight matrix can be further determined. According to the form of the weight matrix, both each row and each column of the matrix include non-zero weights, thus the four input neurons corresponding to the matrix are i1, i2, i3, and i4 respectively; and the output neurons corresponding to the weight matrix are o1, o2, o3, and o4 respectively. Finally, the weight between the input neuron i1 and the output neuron o1 can be determined to be 4; the weight between the input neuron i1 and the output neuron o2 can be determined to be 1, the weight between the input neuron i3 and the output neuron o3 can be determined to be 5; the weight between the input neuron i3 and the output neuron o4 can be determined to be 7; the weight between the input neuron i4 and the output neuron o1 can be determined to be 6; the weight between the input neuron i4 and the output neuron o2 can be determined to be 3; the weight between the input neuron i4 and the output neuron o4 can be determined to be 8; and finally the structure of the neural network is shown in FIG. 14.

For the output neuron o1, the mapping unit outputs the weights 5 and 4 which correspond to the input neurons i1 and i2 respectively; for the output neuron o2, the mapping unit outputs the weights 1 and 3 which correspond to input neurons i2 and i4 respectively; and for the output neuron o3, the mapping unit outputs the weights 2, 7, and 8 which correspond to input neurons i1, i3, and i4. The mapping unit stores the weights 4, 6, 1, 3, 5, 2, 7, and 8 in the first input caching unit.

Compared with the form of COO, by representing the connection data in the form of CSC, the information of column index can be compressed, which may be effective for arithmetic operation, column slicing, and point multiplication of matrix and vector.

Form 5: (ELL Pack, ELL)

In the form of ELL, two matrices with the same number of rows as the weight matrix are used to store the information of non-zero weights in the weight matrix. The first matrix stores the column numbers of the non-zero weights in the weight matrix, and the second matrix stores the values of the non-zero weights in the weight matrix. The row numbers are not stored and are represented by rows in which the non-zero weights are located. The non-zero weights in each row of the two matrices are placed from the beginning, and if no elements exist, an end sign (e.g. *) is placed.

For example, assuming the weight matrix is $$\begin{bmatrix} x1 & 0 \\ 0 & x4 \\ x2 & x5 \\ x3 & 0 \end{bmatrix},$$

the connection data of the weight matrix is represented in the form of ELL as follows: the first matrix is $$\begin{bmatrix} 0 & * \\ 1 & * \\ 0 & 1 \\ 0 & * \end{bmatrix},$$

and the second matrix is $$\begin{bmatrix} x1 & 0 \\ x4 & 0 \\ x2 & x5 \\ x3 & 0 \end{bmatrix}.$$

The count of rows of the first matrix and the second matrix shows that the count of input neurons corresponding to the weight matrix is 4, which are input neurons i1, i2, i3, and i4; and the count of columns of the first matrix and the second matrix shows that the count of output neurons corresponding to the weight matrices is 2, which are output neurons o1 and o2. According to the first matrix and the second matrix, the weight between the input neuron i1 and the output neuron o1 is x1, the weight between the input neuron i2 and the output neuron o2 is x4, the weight between the input neuron i3 and the output neuron o1 is x2, the weight between the input neuron i3 and the output neuron o2 is x5, and the weight between the input neuron i4 and the output neuron o1 is x3. The neural network structure shown in FIG. 12 can be obtained from the connection data represented by the ELL.

For the output neuron o1, the mapping unit outputs the weights x1, x2, and x3, which correspond to the input neurons i1, i3, and i4 respectively; for the output neuron o2, the mapping unit outputs the weights x4 and x5, which correspond to the input neurons i2 and i3 respectively. The mapping unit stores the weights x1, x2, x3, x4, and x5 in the first input caching unit.

For the connection data represented by ELL, when the non-zero elements of one row of the weight matrix are superfluous to other rows, a plurality of end signs will be placed at the end of the first matrix, which wastes caching resources. In order to solve the problem, the connection data can be represented in the way shown in form 6.

Form 6: Hybird (HYB)

The form can be regarded as a combination of the ELL and the COO, in which the COO is used to store the superfluous non-zero weights of one row in the weight matrix relative to other rows and the ELL is used to store the maximum identical number of non-zero weights in each row of the weight matrix.

Assuming that the weight matrix is $$\begin{bmatrix} 1 & 7 & 0 & 0 \\ 0 & 2 & 8 & 0 \\ 5 & 0 & 3 & 9 \\ 0 & 6 & 0 & 4 \end{bmatrix},$$

then the third matrix in the form of ELL is $$\begin{bmatrix} 0 & 1 \\ 1 & 2 \\ 0 & 2 \\ 1 & 3 \end{bmatrix}$$

and the fourth matrix in the form of ELL is $$\begin{bmatrix} 1 & 7 \\ 2 & 8 \\ 5 & 3 \\ 6 & 4 \end{bmatrix}.$$

Figure 15:
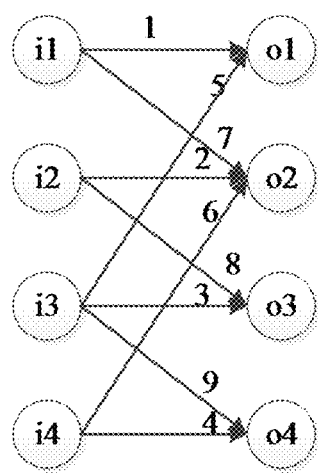
FIG. 15 is a schematic structural diagram of another neural network according to an example of the present disclosure.

The tuple of the form of COO is (2, 3, 9). The count of rows of the third matrix and the fourth matrix shows that the count of input neurons corresponding to the weight matrix is 4, which are the input neurons i1, i2, i3, and i4 respectively. The column number (3) in the coordinates list shows that the count of output neurons corresponding to the weight matrix is 4, which are the output neurons o1, o2, o3, and o4 respectively. According to the first matrix, the second matrix, and the coordinates list, the weight between the input neuron i1 and the output neuron o1 is 1, the weight between the input neuron i1 and the output neuron o2 is 7, the weight between the input neuron i2 and the output neuron o2 is 2, the weight between the input neuron i2 and the output neuron o3 is 8, the weight between the input neuron i3 and the output neuron o1 is 5, the weight between the input neuron i3 and the output neuron o3 is 3, the weight between the input neuron i3 and the output neuron o4 is 6, and the weight between the input neuron i4 and the output neuron o4 is 4. The neural network structure shown in FIG. 15 can be obtained.

For the output neuron o1, the mapping unit outputs the weights 1 and 5, which correspond to the input neurons i1 and i3 respectively; for the output neuron o2, the mapping unit outputs the weights 7 and 2, which correspond to the input neurons i1 and i2 respectively; for the output neuron o3, the mapping unit outputs the weights 8 and 3, which correspond to the input neurons i2 and i3 respectively; and for the output neuron o4, the mapping unit outputs the weights 9 and 4, which correspond to the input neurons i3 and i4 respectively. The mapping unit stores the weights 1, 5, 7, 2, 8, 3, 9, and 4 in the first input caching unit.

To sum up, the six forms (LIL, COO, CSC, CSR, ELL, HYB) may occupy less storage space with higher sparsity. LIL may occupy slightly more than 2*nnz storage units according to different implementation structures, so the space cost may be less than other forms. If the count of non-zero elements is less than the count of rows or columns, COO may be more economical than CSR/CSC, otherwise CSR/CSC may be more economical. If the count of the non-zero elements in each row is relatively uniform, that is, the count of non-zero elements in each row of the matrix is not significantly different, then the count of non-zero elements in the rows with the most non-zero elements will be less than that in the corresponding rows with the most non-zero elements in a non-uniform matrix, thus the ELL can be considered. Under extreme uniformity, that is, the count of non-zero elements in each row is the same, the count of storage units occupied by ELL is 2*nnz, which is less than COO, CSR, and CSC. However, sparse neural networks cannot guarantee to have such characteristics. Some specific sparse neural network models may have such characteristics, in which case ELL is better. In a case when the count of sparse elements in each row of the matrix is relatively uniform, the form of ELL is the best, which is followed by HYB (ELL+COO).

In terms of parallelism, COO can be generated in parallel, and two of the three arrays of CSR and CSC can also be generated in parallel. During computations, COO, LIL, and ELL can be computed in parallel, while CSC, CSR, and HYB need more preprocessing.

CSR is more suitable when a sparse matrix performs left multiplication on a vector, while CSC is more suitable when a sparse matrix performs right multiplication on transposition of a vector, and the two forms can be converted to each other by transposition. The two forms and COO can be used in the propagation of neural networks. The form of ELL has the highest efficiency when a sparse matrix-vector product is performed.

It should be noted that the non-zero weights may also be replaced by weights greater than a first preset threshold.

Optionally, the first preset threshold may be 0.5, 1, 1.2, 1.5, 2, or other values.

It should be noted that in the examples shown in FIG. 1*b*, FIG. 5*a*, FIG. 5*b*, FIG. 6*a*, or FIG. 6*b*, the connection data of input neurons is also represented in the above six forms (LIL, COO, CSR, CSC, ELL, HYB) in addition to the direct index and the stride index.

When the connection data of the input neurons are represented in the above six forms, the non-zero weights can be replaced by non-zero input neurons and the weight matrix can be replaced by an input neuron matrix.

Furthermore, the non-zero input neurons can be replaced by input neurons greater than a second preset threshold.

Optionally, the second preset threshold may be 0.5, 1, 1.2, 1.5, 2, or other values. The first preset threshold and the second preset threshold may be identical or different.

It should be noted that the related connection data (including weight connection data and input neuron connection data) in the examples shown in FIG. 1*b*, FIG. 5*a*, FIG. 5*b*, FIG. 6*a*, or FIG. 6*b* can be represented by a high-dimensional dynamic array, a linked list, and the like.

It should be noted that the neural network operation module can perform both sparse and dense neural network operations. The neural network operation module is suitable for performing the sparse neural network operation, because plenty of zero-value data or data with small absolute values exist in the sparse neural network. The data can be extracted by the mapping unit, which may improve the operating efficiency under the condition of assuring operation precision.

It should be pointed out that the input neurons and the output neurons mentioned in the examples of the present disclosure do not refer to the neurons in the input layer and output layer of the whole neural network. Instead, for neurons in any two adjacent layers of the neural network, the neurons in the lower layer of the network feed forward operation are called input neurons, while the neurons in the upper layer of feed forward operation are called output neurons. Taking a convolution neural network as an example, assuming that a convolution neural network has L layer and K=1,2,3 ... L−1, for a $K^{th}$ layer and a $K+1^{th}$ layer, the $K^{th}$ layer is called an input layer, neurons in the layer are called the input neurons, the $K+1^{th}$ layer is called an input layer, and neurons in the layer are called the output neurons, which means that except for a top layer, each layer can be taken as the input layer, and the next layer is the corresponding output layer.

The above units may be hardware circuits including digital circuits, analog circuits, and the like. Physical implementation of a hardware circuit includes but is not limited to a physical device, and the physical device includes but is not limited to a transistor, a memristor, and the like. The operation unit in the neural network operation module may be any proper hardware processor, for example, a central processing unit (CPU), a graphics processing unit (GPU), a field-programmable gate array (FPGA), a digital signal processor (DSP), and an application specific integrated circuit (ASIC). The storage unit, the instruction caching unit, the first input caching unit, the second input caching unit, and the output caching unit may be any proper magnetic storage medium or magneto-optical storage medium, for example, a resistance random access memory (RRAM), a DRAM, an SRAM, an embedded DRAM (EDRAM), a high bandwidth memory (HBM), a hybrid memory cube (HMC), and the like.

Examples of the present disclosure provide a neural network operation device including one or more neural network operation modules described in the examples shown in FIG. 1*b*, FIG. 5*a*, FIG. 5*b*, FIG. 6*a*, or FIG. 6*b*. The neural network operation device is configured to obtain data to be operated and control information from other processing devices, perform a specified neural network operation to obtain an operation result, and transmit the operation result to other processing devices through the I/O interface;

when the neural network operation device includes a plurality of the neural network operation modules, the plurality of the neural network operation modules may be connected through a specific structure and transmit data between each other; and the plurality of the neural network operation modules interconnect and transmit data through a PCIE (Peripheral Component Interface-Express, PCI-E or PCIe) bus to support larger-scale neural network operation; share the same one control system or have respective control systems; share the same one memory or have respective memories; and deploy an interconnection manner of any arbitrary interconnection topology.

The neural network operation device has high compatibility and can be connected to various types of servers through the PCIE interface.

Examples of the present disclosure provide a combined processing device, and the combined processing device may include the neural network operation device, a universal interconnection interface, and other processing devices.

Figure 16A:
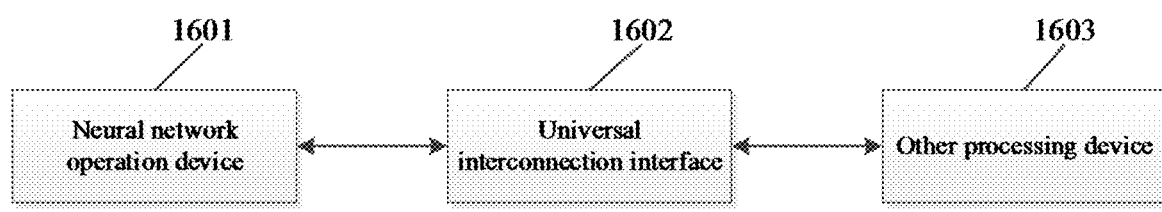
FIG. 16a is a schematic structural diagram of a combined processing device according to an example of the present disclosure.

The neural network operation device may be configured to interact with the other processing devices to jointly perform operations specified by users. FIG. 16*a* is a schematic structural diagram of a combined processing device according to an example of the present disclosure. As shown in FIG. 16*a*, the combined processing device includes the neural network operation device 1601, a universal interconnection interface 1602, and other processing devices 1603.

The other processing device 1603 includes one or more processor types of general-purpose/special-purpose processors such as CPU, GPU, a neural network processor, and the like. The count of processors included in the other processing device 1603 is not limited. The other processing device 1603 as the interface between the neural network operation device 1601 and external data or control, which includes data transfer, is configured to perform basic control such as starting and stopping of the neural network operation device; and the other processing device 1603 may also cooperate with the neural network operation device 1601 to perform operation tasks.

The universal interconnection interface 1602 is configured to transmit data and control instructions between the neural network operation device 1601 and the other processing device 1603. The neural network operation device 1601 may obtain required input data from the other processing device 1603, and then write the required input data into an on-chip storage device of the neural network operation device; or obtain control instructions from the other processing device 1603 and then write the control instructions into a control cache into the neural network operation device 1601; or read data in the storage module of the neural network operation device 1601 and then transmit the data to the other processing device 1603.

Figure 16B:
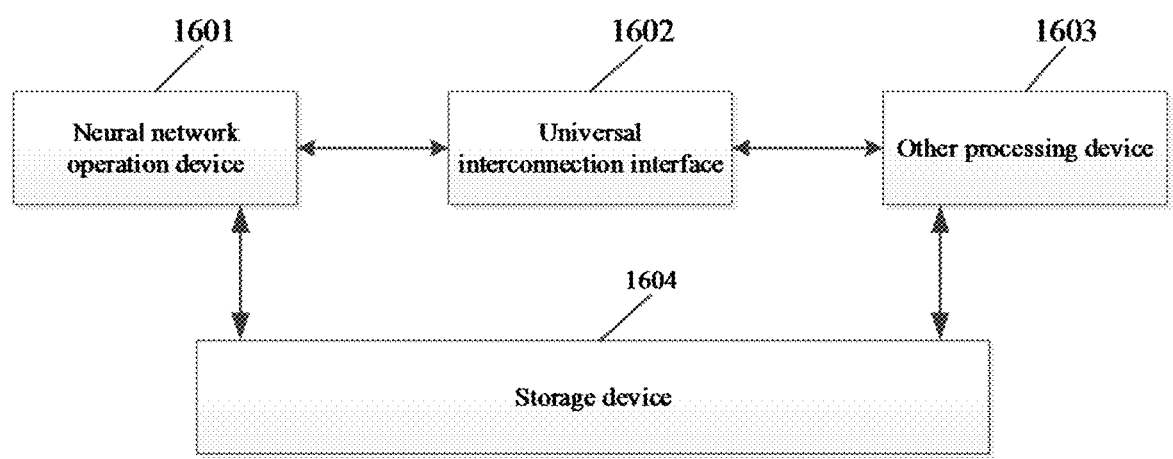
FIG. 16b is a schematic structural diagram of another combined processing device according to an example of the present disclosure.

Optionally, as shown in FIG. 16*b*, the combined processing device further includes a storage device 1604 configured to store data required by the operation unit/operation device or other operation unit, especially the required data that cannot be fully stored in the internal storage of the neural network operation device 1601 or the other processing device 1603.

The combined device may be used as an on-chip system of smart devices such as mobile phones, robots, and drones, which may effectively reduce the core area of the control part, improve processing speed, and reduce overall power consumption.

An example of the present disclosure provides a neural network chip including the neural network operation module of the examples shown in FIG. 1*b*, FIG. 5*a*, FIG. 5*b*, FIG. 6*a*, or FIG. 6*b*, or the neural network operation device, or the combined processing device.

An example of the present disclosure provides a neural network chip package structure including the neural network chip.

An example of the present disclosure provides a board card including the neural network chip package structure. The board card can be used in multiple general-purpose or special-purpose computing system environments or configurations, such as a personal computer, a server computer, a handheld device or a portable device, a tablet device, a smart home, a household appliance, a multi-processor system, a microprocessor-based system, a robot, a programmable consumer electronic device, a personal computer (PC), a mini-computer, a mainframe computer, a distributed computing environment including any of the above systems or devices, and the like.

Figure 17:
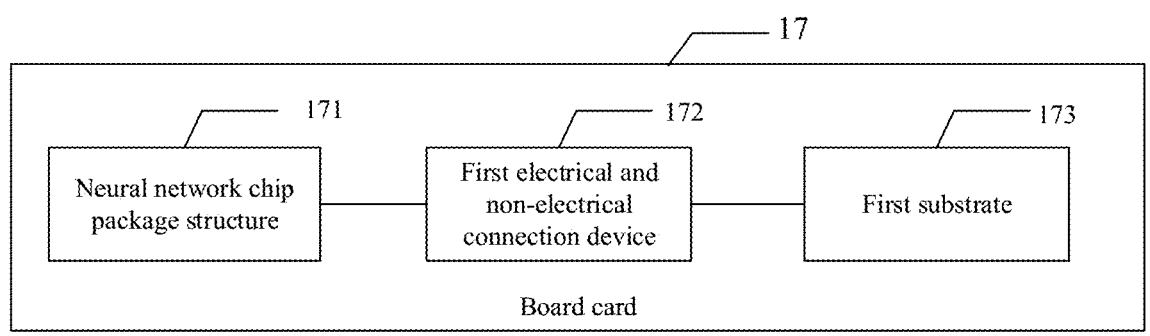
FIG. 17 is a schematic structural diagram of a board card according to an example of the present disclosure.

FIG. 17 is a schematic diagram of a board card according to an example of the present disclosure. As shown in FIG. 17, a board card 17 includes a neural network chip package structure 171, a first electrical and non-electrical connection device 172, and a first substrate 173.

Figure 18:
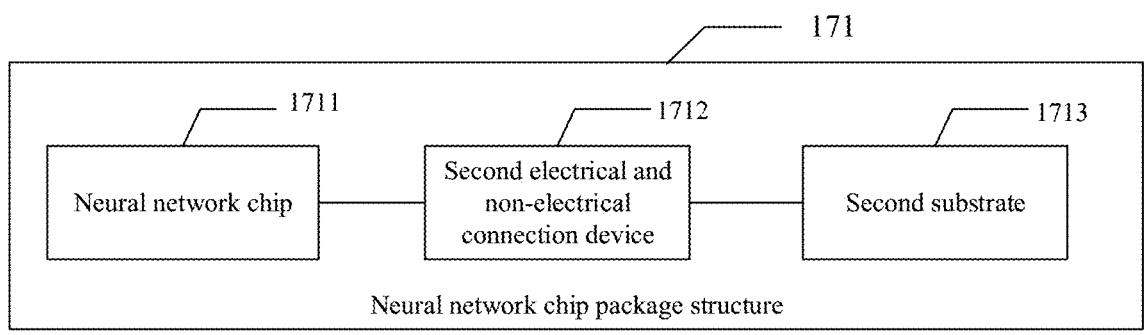
FIG. 18 is a schematic diagram of a neural network chip package structure according to an example of the present disclosure.

The specific structure of the neural network chip package structure 171 is not limited hereto. As shown in FIG. 18, the neural network chip package structure 171 includes: a neural network chip 1711, a second electrical and non-electrical connection device 1712, and a second substrate 1713.

The specific form of the neural network chip 1711 is not limited hereto. The neural network chip 1711 includes, but is not limited to, a neural network chip integrated with a neural network processor. The chip can be made of silicon materials, germanium materials, quantum materials, molecular materials, or the like. The neural network chip can be packaged according to actual situations (such as harsh environment) and different application requirements, so that most of the neural network chip can be packaged. Pins on the neural network chip are connected to the outside of the package structure through conductors such as gold wires for circuit connection with the outer layer.

The disclosure is not intended to limit the types of the first substrate 173 and the second substrate 1713, which may be a printed circuit board (PCB), a printed wiring board (PWB), or other circuit boards. PCB manufacturing materials are not limited hereto, either.

The second substrate 1713 of the present disclosure is configured to carry the neural network chip 1711, and the neural network chip package structure 171 obtained by connecting the neural network chip 1711 and the second substrate 1713 through the second electrical and non-electrical connection device 1712 is configured to protect the neural network chip 1711, so as to facilitate further packaging of the neural network chip package structure 171 and the first substrate 173.

The specific packaging modes and corresponding structure of the second electrical and non-electrical connection device 1712 are not limited hereto. According to actual situations and different application requirements, appropriate packaging mode can be selected and simply improved, such as a Flip Chip Ball Grid Array Package (FCBGAP), a Low-profile Quad Flat Package (LQFP), a Quad Flat Package with Heat sink (HQFP), a Quad Flat Non-lead Package (QFN), a Fine-pitch Ball Grid Package (FBGA), or other packaging methods.

The Flip Chip may be suitable for cases where the requirement on the area after packaging is high or inductance of a conductive wire and transmission time of a signal are sensitive. In addition, the packaging mode of Wire Bonding may be adopted to reduce the cost and increase flexibility of the package structure.

The Ball Grid Array may provide more pins, and the conductive wire of the pins is short on average, which has a function of transmitting signals at high speed, where a Pin Grid Array (PGA), a 0 Insertion Force (ZIF), a Single Edge Contact Connection (SECC), a Land Grid Array (LGA), and other package method may be adopted.

Figure 19:
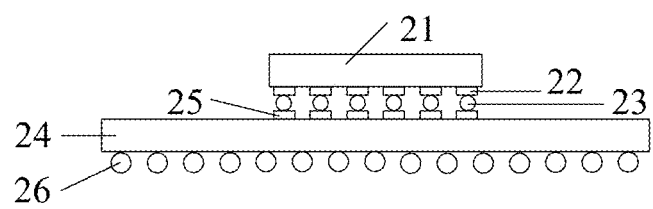
FIG. 19 is a schematic diagram of another neural network chip package structure according to an example of the present disclosure.

Optionally, the packaging mode of Flip Chip Ball Grid Array may be adopted to package the neural network chip 1711 and the second substrate 1713. FIG. 19 is a schematic diagram of a neural network chip package structure. As shown in FIG. 19, the chip package structure includes a neural network chip 21, a pad 22, a bump 23, a second substrate 24, a connection point 25 on the second substrate 24, and a pin 26.

The pad 22 is connected to the neural network chip 21, and the bump 23 is formed by welding between the pad 22 and the connection point 25 on the second substrate 24 to connect the neural network chip 21 and the second substrate 24, thereby realizing the package of chip 21.

The pin 26 may be configured to connect with an external circuit of the package structure (for example, the first substrate 173 on the neural network processor board card 17) to transmit external data and internal data, which may facilitate the neural network chip 21 or the processor processing corresponding to the neural network chip 21 processing data. The type and number of pins are not limited hereto. Different types of pins can be selected according to different packaging technologies, and are arranged according to certain rules.

Optionally, the neural network chip package structure may further include an insulating filler disposed in the gap between the pad 22, the bump 23, and the connection point 25 for preventing interference between bumps, where the material of the insulating filler may be silicon nitride, silicon oxide, or silicon oxynitride; and the interference may include electromagnetic interference, inductance interference, and the like.

Optionally, the neural network chip package structure may further include a heat dissipation device for dissipating heat generated by the neural network chip 21, where the heat dissipation device may be a piece of metal with good thermal conductivity, a fin, or a radiator such as a fan.

Figure 20:
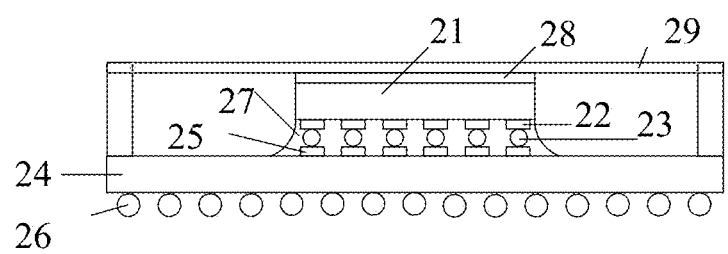
FIG. 20 is a schematic diagram of another neural network chip package structure according to an example of the present disclosure.

For example, as shown in FIG. 20, the neural network chip package structure 171 may include the neural network chip 21, the pad 22, the bump 23, the second substrate 24, the connection point 25 on the second substrate 24, the pin 26, an insulating filler 27, thermal grease 28, and a fin 29 with metal housing, where the thermal grease 28 and the fin 29 with metal housing are configured to dissipate the heat generated by the neural network chip 21.

Optionally, the neural network chip package structure 171 may further include a reinforcing structure, which is connected to the pad 22, and is buried in the bump 23 to enhance the connection strength between the bump 23 and the pad 22. The reinforcing structure may be a metal wire structure or a columnar structure, which is not limited hereto.

The specific form of the first electrical and non-electrical device 172 is not limited hereto. Please refer to the description of the second electrical and non-electrical device 1712, that is, the neural network chip package structure 171 may be packaged by welding, or by connecting the second substrate 1713 and the first substrate 173 through a connecting line or an inserting method, so as to subsequently replace the first substrate 173 or the neural network chip package structure 171.

Optionally, the first substrate 173 may include an interface of the memory unit for expanding a storage capacity, for example, a Synchronous Dynamic Random Access Memory (SDRAM), and a Double Date Rate (DDR) SDRAM, and the like. By expanding the memory, the processing capacity of the neural network processor may be improved.

The first substrate 173 may further include a Peripheral Component Interconnect-Express (PCI-E or PCIe) interface, a Small Form-factor Pluggable (SFP) interface, and an Ethernet interface, a Controller Area Network (CAN) interface, etc. for data transmission between the package structure and the external circuit, which may improve operating speed and convenience of operation.

By packaging the neural network processor as the neural network chip 1711, packaging the neural network chip 1711 as the neural network chip package structure 171, and packaging the neural network chip package structure 171 as the board card 17, vacancy of the current neural networks may be filled. Furthermore, data interaction with the external circuit (for example, a computer motherboard) may be performed through an interface (slot or ferrule) on the board card, that is, the function of the neural network processor may be implemented by directly using the board card 17, and the neural network chip 1711 may be protected. Other modules may be added to the board card 17, which may increase the application scope and operating efficiency of the neural network processor.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance and/or medical equipment.

The transportation means may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner, and/or an electrocardiograph.

Figure 21:
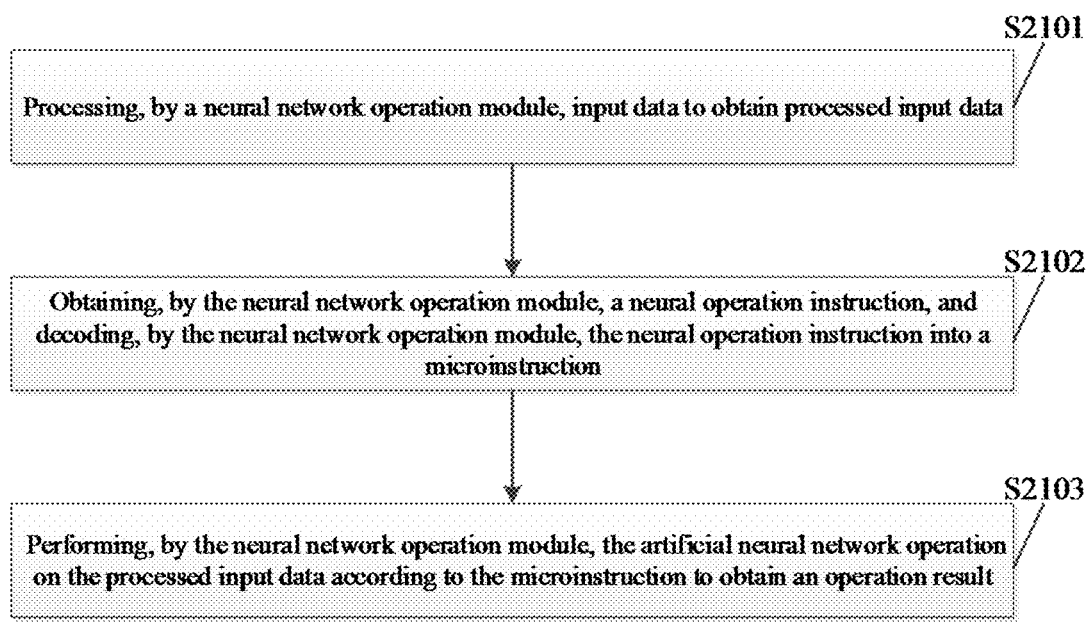
FIG. 21 is a flowchart of a neural network operation method according to an example of the present disclosure.

FIG. 21 is a flowchart of a neural network operation method according to an example of the present disclosure. As shown in FIG. 21, the method includes:

in step S2101, processing, by a neural network operation module, input data to obtain processed input data, where the input data includes at least one input neuron and/or at least one weight. Prior to the processing the input data, the method further includes:

grouping the least one input neuron to obtain M groups of the input neurons, where the M is an integer greater than or equal to 1;

determining whether each group of the input neurons in the M groups of the input neurons satisfies a first preset condition, where the first preset condition includes that the count of the input neuron whose absolute value is smaller than or equal to the third threshold in a group of the input neurons is smaller than or equal to the fourth threshold;

deleting the group of input neurons when any group of the input neurons in the M groups of the input neurons does not satisfy the first preset condition;

grouping the at least one weight to obtain N groups of the weights, where the N is an integer greater than or equal to 1;

determining whether each group of the weights in the N groups of the weights satisfies a second preset condition, where the second preset condition includes that the count of the weight whose absolute value is smaller than or equal to a fifth threshold in a group of the weights is smaller than or equal to a sixth threshold; and deleting the group of weights when any group of the weights in the N groups of the weights does not satisfy the second preset condition.

Optionally, the input data includes first input data and second input data. The processed input data includes processed first input data and processed second input data. The processing the input data to obtain the processed input data includes:

processing the second input data to obtain first connection data and the processed second output data;

processing the first input data according to the first connection data to obtain the processed second input data;

when the first input data is the input neuron and the second input data is the weight, the first connection data is connection data of the weight; and when the first input data is the weight and the second input data is the input neuron, the first connection data is connection data of the input neuron.

Optionally, the input data includes input neurons and weights, and the processed input data includes the processed input neuron and the processed weight. The processing the input data to obtain the processed input data includes:

obtaining the connection data of the input neuron and the connection data of the weight according to the input neuron and the weight;

processing the connection data of the input neuron and the connection data of the weight to obtain second connection data; and processing the input neuron and the weight according to the second connection data to obtain the processed input neuron and the processed weight.

Optionally, the connection data of the input neuron and the connection data of the weight are represented in the form of direct index. The processing the connection data of the input neuron and the connection data of the weight to obtain the second connection data includes: performing an AND operation on the connection data of the input neuron and the connection data of the weight to obtain third connection data.

Optionally, the processing the connection data of the input neuron and the connection data of the weight to obtain the second connection data includes:

when the connection data of the input neuron is represented in the form of direct index and the connection data of the weight is represented in the form of stride index, converting the connection data of the weight into the connection data represented in the form of direct index;

when the connection data of the weight is represented in the form of direct index and the connection data of the input neuron is represented in the form of stride index, converting the connection data of the input neuron into the connection data represented in the form of direct index; and performing the AND operation on the connection data of the input neuron and the connection data of the weight to obtain the third connection data.

Optionally, when both the connection data of the input neuron and the connection data of the weight are represented in the form of stride, and the connection data of the weight and a string of the connection data of the input neuron are stored in an order of physical address from low to high, the processing the connection data of the input neuron and the connection data of the weight to obtain the second connection data includes:

accumulating each element in the string of the connection data of the input data and an element that is stored in a physical address lower than the physical address in which the each element is stored to obtain new elements, in which the new elements compose third connection data; similarly, performing the same operation on a string of the connection data of the weight to obtain fourth connection data;

selecting the same elements from the string of the third connection data and the string of the fourth connection data, and sorting the elements in an order of element values from small to large to form a new string; and performing a subtraction on each element in the new string and an element (adjacent to the element) whose value is smaller than the value of the element to obtain new elements, in which the new elements compose the third connection data.

Optionally, when the strings representing the connection data of the weight and the connection data of the input neuron are stored in an order of physical address from low to high, the processing the connection data of the input neuron and the connection data of the weight to obtain the second connection data includes:

when the connection data of the input neuron is represented in the form of stride index and the connection data of the weight is represented in the form of direct index, converting the connection data of the weight into the connection data represented in the form of stride index;

when the connection data of the weight is represented in the form of stride index and the connection data of the input neuron is represented in the form of direct index, converting the connection data of the input neuron into the connection data represented in the form of stride index;

accumulating each element in the string of the first connection data and an element that is stored in a physical address lower than the physical address in which the each element is stored to obtain new elements, in which the new elements compose the fourth connection data; similarly, performing the same operation on a string of the second connection data to obtain the fifth connection data;

selecting the same elements from the string of the fourth connection data and the string of the fifth connection data, and sorting the elements in an order of element values from small to large to form a new string; and performing a subtraction on each element in the new string and an element (adjacent to the element) whose value is smaller than the value of the element to obtain new elements, in which the new elements compose the third connection data.

Optionally, the processing the input data to obtain the processed input data includes:

when the input data includes the input neuron and the connection data of the input neuron, processing the input neuron according to the connection data of the input neuron to obtain the processed input neuron; and when the input data includes the weight and the connection data of the weight, processing the weight according to the connection data of the weight to obtain the processed weight.

The connection data of the input neuron and the connection data of the weight being represented in the form of direct index or stride index includes:

when the connection data of the input neuron is represented in the form of direct index, the connection data is a string composed of 0 and 1, where 0 indicates that the absolute value of the input neuron is smaller than or equal to a first threshold and 1 indicates that the absolute value of the input neuron is greater than the first threshold;

when the connection data of the input neuron is represented in the form of stride index, the connection data is a string composed of values of distance between the input neuron whose absolute value is greater than the first threshold and the previous input neuron whose absolute value is greater than the first threshold;

when the connection data of the weight is represented in the form of direct index, the connection data is a string composed of 0 and 1, where 0 indicates that the absolute value of the weight is smaller than or equal to the second threshold, which means that the input neuron corresponding to the weight is not connected with the output neuron of the weight; and 1 indicates that the absolute value of the weight is greater than the second threshold, which means that the input neuron corresponding to the weight is connected with the output neuron of the weight; the connection data of the weight represented in the form of direct index may have two orders of representation: a string of 0 and 1 composed of the connection state between each output neuron and all input neurons, or a string of 0 and 1 composed of the connection state between each input neuron and all output neurons; and when the connection data of the weight is represented in the form of stride index, the connection data is a string of values of distance between the input neuron connected with an output neuron and the previous input neuron connected with the output neuron.

The method further includes:

in S2102, obtaining, by the neural network operation module, a neural operation instruction, and decoding the neural operation instruction into a microinstruction; and in S2103, performing, by the neural network operation module, the artificial neural network operation on the processed input data according to the microinstruction to obtain an operation result.

It should be noted that the above steps S2101-S2103 will not be further described here. For the details, please refer to relevant descriptions of the examples shown in FIG. 1b, FIG. 5a, FIG. 5b, FIG. 6a, or FIG. 6b.

Examples of the present disclosure further provide a computer storage medium, in which a program may be stored, and part or all of the steps in any neural network operation method described in the above examples may be included when the program is executed.

It should be noted that for the sake of simplicity, the foregoing method examples are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the examples described in the specification are exemplary examples and the actions and modules involved may be not necessary to the present disclosure.

In the examples, the description of each example has different emphasis. For the parts not described in detail in one example, reference may be made to related descriptions in other examples.

In the examples of the disclosure, it should be understood that the device disclosed may be implemented in other manners. For example, the described device examples are merely illustrative; for instance, division of the unit is only a logical function division and can be divided in other manners during actual implementations, for example, a plurality of units or components may be combined or integrated into another system, or some features may be ignored, or not performed. In addition, coupling or direct coupling or communication connection between each illustrated or discussed component may be indirect coupling or communication connection through some interfaces, devices or units, and may be electrical connection or other forms of connection.

The units described as separate components may or may not be physically separated and the components illustrated as units may or may not be physical units, that is, the units or the components may be in the same place or may be distributed to a plurality of network units. All or part of the units may be selected according to actual needs to achieve the purpose of the technical solutions of the examples.

In addition, functional units in various examples of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various examples of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the examples described above may be accomplished by means of a program to instruct associated hardware, and the program may be stored in a computer-readable memory, which may include a flash memory, a read-only memory (ROM), a random-access memory (RAM), a disk or a compact disc (CD), and the like.

The examples of the present disclosure are described in detail above and specific examples are used herein to describe the principle and implementation manners of the present disclosure. The description of the above examples is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A neural network operation circuit, comprising:
a mapping circuit configured to process input data after receiving the input data to obtain processed input data, wherein the input data includes at least one input neuron and at least one weight, and the processed input data includes a processed input neuron and a processed weight;
a storage circuit configured to store the processed input neuron, the processed weight, a neural network instruction, and an operation result;
an instruction control circuit configured to obtain the neural network instruction from an instruction caching circuit and decode the neural network instruction into a microinstruction executed by an operation circuit;
the operation circuit configured to obtain the processed input neuron and the processed weight from a first input caching circuit and a second input caching circuit, and then perform an artificial neural network operation on the processed input neuron and the processed weight according to the microinstruction to obtain the operation result;
an output caching circuit configured to cache the operation result; and
a direct memory access circuit configured to read/write data between the storage circuit and an instruction caching circuit, the first input caching circuit, the second input caching circuit, or the output caching circuit, wherein the mapping circuit includes:
a first sparse processing circuit configured to process second input data to obtain third output data and second output data, and transmit the third output data to a first data processing circuit, and
the first data processing circuit configured to process first input data according to the third output data to obtain first output data, and
when the first input data includes at least one input neuron and the second input data includes the at least one weight, the first output data is the processed input neuron, the second output data is the processed weight, and the third output data is connection data of the weight, when the first input data includes the at least one weight and the second input data includes the at least one input neuron, the first output data is the processed weight, the second output data is the processed input neuron, and the third output data is connection data of the input neuron.

2. The neural network operation circuit of claim 1, wherein
the instruction caching circuit is configured to cache the neural network instruction read by the direct memory access circuit,
the first input caching circuit configured to cache first cache data read by the direct memory access circuit, wherein the first cache data is the processed input neuron or the processed weight, and
the second input caching circuit is configured to cache second cache data read by the direct memory access circuit, wherein the second cache data is the processed weight or the processed input neuron, and the second cache data is inconsistent with the first cache data.

3. The neural network operation circuit of claim 1, wherein the mapping circuit includes:
a second sparse processing circuit configured to receive third input data, obtain first connection data according to the third input data, and transmit the first connection data to a connection processing circuit,
a third sparse processing circuit configured to receive fourth input data, obtain second connection data according to the fourth input data, and transmit the second connection data to the connection processing circuit,
the connection processing circuit configured to obtain third connection data according to the first connection data and the second connection data, and transmit the third connection data to a second data processing circuit,
the second data processing circuit configured to process the third input data and the fourth input data according to the third connection data after receiving the third input data, the fourth input data, and the third connection data to obtain fourth output data and fifth output data, and
when the third input data includes the at least one input neuron and the fourth input data includes the at least one weight, the first connection data is the connection data of the input neuron, the second connection data is the connection data of the weight, the fourth output data is the processed input neuron, and the fifth output data is the processed weight, when the third input data includes the at least one weight and the fourth input data includes the at least one input neuron, the first connection data is the connection data of the weight, the second connection data is the connection data of the input neuron, the fourth output data is the processed weight, and the fifth output data is the processed input neuron.

4. The neural network operation circuit of claim 3, wherein the connection data of the input neuron and the connection data of the weight being represented in a form of direct index or stride index includes:
when the connection data of the input neuron is represented in the form of direct index, the connection data is a string composed of 0 and 1, wherein 0 indicates that an absolute value of the input neuron is smaller than or equal to a first threshold and 1 indicates that the absolute value of the input neuron is greater than the first threshold,
when the connection data of the input neuron is represented in the form of stride index, the connection data is a string composed of values of distance between the input neuron whose absolute value is greater than the first threshold and the previous input neuron whose absolute value is greater than the first threshold,
when the connection data of the weight is represented in the form of direct index, the connection data is a string composed of 0 and 1, wherein 0 indicates that the absolute value of the weight is smaller than or equal to the second threshold, which means that the input neuron corresponding to the weight is not connected with the output neuron of the weight, and 1 indicates that the absolute value of the weight is greater than the second threshold, which means that the input neuron corresponding to the weight is connected with the output neuron of the weight, the connection data of the weight represented in the form of direct index has two orders of representation: a string of 0 and 1 composed of the connection state between each output neuron and all input neurons, or a string of 0 and 1 composed of the connection state between each input neuron and all output neurons, and when the connection data of the weight is represented in the form of stride index, the connection data is a string of values of distance between the input neuron connected with an output neuron and the previous input neuron connected with the output neuron.

5. The neural network operation circuit of claim 4, wherein when both the connection data of the input neuron and the connection data of the weight are represented in the form of stride index, and the connection data of the weight and a string of the connection data of the input neuron are stored in an ascending order of physical address, the connection processing circuit is configured to:
accumulate each element in the string of the connection data of the input data and an element that is stored in a physical address lower than the physical address in which the each element is stored to obtain new elements, wherein the new elements compose fourth connection data, similarly, perform the same operation on the string of the second connection data to obtain fifth connection data,
select the same elements from the string of the fourth connection data and the string of the fifth connection data, and sort the elements in an ascending order of element values to form a new string, and
perform a subtraction on each element in the new string and an element (adjacent to the element) whose value is smaller than the value of the element to obtain new elements, wherein the new elements compose the third connection data.

6. The neural network operation circuit of claim 4, wherein when both the first connection data and the second connection data are represented in the form of direct index, the connection processing circuit is configured to perform an AND operation on the first connection data and the second connection data to obtain the third connection data.

7. The neural network operation circuit of claim 4, wherein when one of the first connection data and the second connection data is represented in the form of stride index and the other is represented in the form of direct index, the connection processing circuit is configured to:
  when the first connection data is represented in the form of stride index, convert the first connection data into the connection data represented in the form of direct index,
  when the second connection data is represented in the form of stride index, convert the second connection data into the connection data represented in the form of direct index, and
  perform the And operation on the first connection data and the second connection data to obtain the third connection data.

8. The neural network operation circuit of claim 7, wherein when one of the first connection data and the second connection data is represented in the form of stride index and the other is represented in the form of direct index, and the strings representing the first connection data and the second connection data are stored in an ascending order of physical address, the connection processing circuit is further configured to:
  when the first connection data is represented in the form of stride index, convert the second connection data into the connection data represented in the form of stride index,
  when the second connection data is represented in the form of stride index, convert the first connection data into the connection data represented in the form of stride index,
  accumulate each element in the string of the connection data of the input data and an element that is stored in a physical address lower than the physical address in which the each element is stored to obtain new elements, wherein the new elements compose the fourth connection data, similarly, perform the same operation on a string of the second connection data to obtain the fifth connection data,
  select the same elements from the string of the fourth connection data and the string of the fifth connection data, and sort the elements in an ascending order of element values to form a new string, and
  perform a subtraction on each element in the new string and an element (adjacent to the element) whose value is smaller than the value of the element to obtain new elements, wherein the new elements compose the third connection data.

9. The neural network operation circuit of claim 1, wherein before processing the input data, the mapping circuit is further configured to:
  group the at least one input neuron to obtain M groups of the input neurons, wherein the M is an integer greater than or equal to 1,
  determine whether each group of the input neurons in the M groups of the input neurons satisfies a first preset condition, wherein the first preset condition includes that a count of the input neuron whose absolute value is smaller than or equal to the third threshold in a group of the input neurons is smaller than or equal to the fourth threshold, when any group of the input neurons in the M groups of the input neurons does not satisfy the first preset condition, delete the group of the input neurons,
  group the at least one weight to obtain N groups of the weights, wherein the N is an integer greater than or equal to 1,
  determine whether each group of the weights in the N groups of the weights satisfies a second preset condition, wherein the second preset condition includes that the count of the weight whose absolute value is smaller than or equal to the fifth threshold in a group of the weights is smaller than or equal to the sixth threshold, and
  when any group of the weights in the N groups of the weights does not satisfy the second preset condition, delete the group of the weights.

10. The neural network operation circuit of claim 1, wherein the neural network operation circuit is configured to perform a sparse neural network operation and a dense neural network operation.

11. An electronic device, comprising a neural network operation circuit that includes:
  a mapping circuit configured to process input data after receiving the input data to obtain processed input data, wherein the input data includes at least one input neuron and at least one weight, and the processed input data includes a processed input neuron and a processed weight;
  a storage circuit configured to store the processed input neuron, the processed weight, a neural network instruction, and an operation result;
  an instruction control circuit configured to obtain the neural network instruction from an instruction caching circuit and decode the neural network instruction into a microinstruction executed by an operation circuit;
  the operation circuit configured to obtain the processed input neuron and the processed weight from a first input caching circuit and a second input caching circuit, and then perform an artificial neural network operation on the processed input neuron and the processed weight according to the microinstruction to obtain the operation result;
  an output caching circuit configured to cache the operation result; and
  a direct memory access circuit configured to read/write data between the storage circuit and an instruction caching circuit, the first input caching circuit, the second input caching circuit, or the output caching circuit,
  wherein the mapping circuit includes:
  a first sparse processing circuit configured to process second input data to obtain third output data and second output data, and transmit the third output data to a first data processing circuit, and
  the first data processing circuit configured to process first input data according to the third output data to obtain first output data, and
  when the first input data includes at least one input neuron and the second input data includes the at least one weight, the first output data is the processed input neuron, the second output data is the processed weight, and the third output data is connection data of the weight, when the first input data includes the at least one weight and the second input data includes the at least one input neuron, the first output data is the processed weight, the second output data is the processed input neuron, and the third output data is connection data of the input neuron.

12. A neural network operation method, comprising
processing input data to obtain processed input data;
obtaining a neural operation instruction and decoding the neural operation instruction into a microinstruction; and
performing an artificial neural network on the processed input data according to the microinstruction to obtain an operation result,
wherein the processing the input data to obtain the processed input data includes:
  when the input data includes the input neuron and the connection data of the input neuron, processing the input neuron according to the connection data of the input neuron to obtain the processed input neuron, and
  when the input data includes the weight and the connection data of the weight, processing the weight according to the connection data of the weight to obtain the processed weight
wherein the mapping circuit includes:
a first sparse processing circuit configured to process second input data to obtain third output data and second output data, and transmit the third output data to a first data processing circuit, and
the first data processing circuit configured to process first input data according to the third output data to obtain first output data, and
  when the first input data includes at least one input neuron and the second input data includes the at least one weight, the first output data is the processed input neuron, the second output data is the processed weight, and the third output data is connection data of the weight, when the first input data includes the at least one weight and the second input data includes the at least one input neuron, the first output data is the processed weight, the second output data is the processed input neuron, and the third output data is connection data of the input neuron.

13. The neural network operation circuit of claim 12, wherein the input data includes at least one input neuron and/or a weight, before processing the input data, the method further includes:
grouping the at least one input neuron to obtain M groups of the input neurons, wherein the M is an integer greater than or equal to 1,
determining whether each group of the input neurons in the M groups of the input neurons satisfies a first preset condition, wherein the first preset condition includes that the count of the input neuron whose absolute value is smaller than or equal to the third threshold in a group of the input neurons is smaller than or equal to the fourth threshold, when any group of the input neurons in the M groups of the input neurons does not satisfy the first preset condition, deleting the group of the input neurons,
grouping the at least one weight to obtain N groups of the weights, wherein the N is an integer greater than or equal to 1,
determining whether each group of the weights in the N groups of the weights satisfies a second preset condition, wherein the second preset condition includes that the count of the weight whose absolute value is smaller than or equal to the fifth threshold in a group of the weights is smaller than or equal to the sixth threshold, and when any group of the weights in the N groups of the weights does not satisfy the second preset condition, deleting the group of the weights.

14. The method of claim 12, wherein the input data includes the first input data and the second input data, and the processed input data includes the processed first input data and the processed second input data, the processing the input data to obtain the processed input data includes:
  processing the second input data to obtain the first connection data and the processed second output data,
  processing the first input data according to the first connection data to obtain the processed second input data, and
  when the first input data is the input neuron and the second input data is the weight, the first connection data is the connection data of the weight, when the first input data is the weight and the second input data is the input neuron, the first connection data is the connection data of the input neuron.

15. The method of claim 12, wherein the input data includes the input neuron and the weight, and the processed input data includes the processed input neuron and the processed weight, and the processing input data to obtain the processed input data includes:
  obtaining the connection data of the input neuron and the connection data of the weight according to the input neuron and the weight,
  processing the connection data of the input neuron and the connection data of the weight to obtain the second connection data, and
  processing the input neuron and the weight according to the second connection data to obtain the processed input neuron and the processed weight.

16. The method of claim 15, wherein when the connection data of the input neuron and the connection data of the weight are represented in the form of direct index, the processing the connection data of the input neuron and the connection data of the weight to obtain the second connection data includes: performing an AND operation on the connection data of the input neuron and the connection data of the weight to obtain the second connection data.

17. The method of claim 15, wherein the processing the connection data of the input neuron and the connection data of the weight to obtain the second connection data includes:
  when the connection data of the input neuron is represented in the form of direct index and the connection data of the weight is represented in the form of stride index, converting the connection data of the weight into the connection data represented in the form of direct index,
  when the connection data of the weight is represented in the form of direct index and the connection data of the input neuron is represented in the form of stride index, converting the connection data of the input neuron into the connection data represented in the form of direct index, and
  performing the AND operation on the connection data of the input neuron and the connection data of the weight to obtain the second connection data.

18. The method of claim 15, wherein when both the connection data of the input neuron and the connection data of the weight are represented in the form of stride, and the connection data of the weight and a string of the connection data of the input neuron are stored in an ascending order of physical address, the processing the connection data of the input neuron and the connection data of the weight to obtain the second connection data includes:

accumulating each element in the string of the connection data of the input data and an element that is stored in a physical address lower than the physical address in which the each element is stored to obtain new elements, wherein the new elements compose third connection data, similarly, performing the same operation on a string of the connection data of the weight to obtain fourth connection data, selecting the same elements from the string of the third connection data and the string of the fourth connection data, and sorting the elements in an ascending order of element values to form a new string, and performing a subtraction on each element in the new string and an element (adjacent to the element) whose value is smaller than the value of the element to obtain new elements, wherein the new elements compose the second connection data.

19. The method of claim 15, when the strings representing the connection data of the weight and the connection data of the input neuron are stored in an ascending order of physical address, the processing the connection data of the input neuron and the connection data of the weight to obtain the second connection data includes:

when the connection data of the input neuron is represented in the form of stride index and the connection data of the weight is represented in the form of direct index, converting the connection data of the weight into the connection data represented in the form of stride index, when the connection data of the weight is represented in the form of stride index and the connection data of the input neuron is represented in the form of direct index, converting the connection data of the input neuron into the connection data represented in the form of stride index, accumulating each element in the string of the connection data of the input data and an element that is stored in a physical address lower than the physical address in which the each element is stored to obtain new elements, wherein the new elements compose the third connection data, similarly, performing the same operation on a string of the second connection data to obtain the fourth connection data, selecting the same elements from the string of the third connection data and the string of the fourth connection data, and sorting the elements in an ascending order of element values to form a new string, and performing a subtraction on each element in the new string and an element (adjacent to the element) whose value is smaller than the value of the element to obtain new elements, wherein the new elements compose the second connection data.

20. The method of claim 15, wherein the connection data of the input neuron and the connection data of the weight being represented in the form of direct index or stride index includes:

when the connection data of the input neuron is represented in the form of direct index, the connection data is a string composed of 0 and 1, where 0 indicates that the absolute value of the input neuron is smaller than or equal to a first threshold and 1 indicates that the absolute value of the input neuron is greater than the first threshold, when the connection data of the input neuron is represented in the form of stride index, the connection data is a string composed of values of distance between the input neuron whose absolute value is greater than the first threshold and the previous input neuron whose absolute value is greater than the first threshold, when the connection data of the weight is represented in the form of direct index, the connection data is a string composed of 0 and 1, where 0 indicates that the absolute value of the weight is smaller than or equal to the second threshold, which means that the input neuron corresponding to the weight is not connected with the output neuron of the weight, and 1 indicates that the absolute value of the weight is greater than the second threshold, which means that the input neuron corresponding to the weight is connected with the output neuron of the weight, the connection data of the weight represented in the form of direct index may have two orders of representation: a string of 0 and 1 composed of the connection state between each output neuron and all input neurons, or a string of 0 and 1 composed of the connection state between each input neuron and all output neurons, and when the connection data of the weight is represented in the form of stride index, the connection data is a string of values of distance between the input neuron connected with an output neuron and the previous input neuron connected with the output neuron.

* * * * *